(12) United States Patent
Fukao et al.

(10) Patent No.: US 7,706,008 B2
(45) Date of Patent: Apr. 27, 2010

(54) OUTPUT SYSTEM, NETWORK DEVICE, OUTPUT DATA MANAGING DEVICE, OUTPUT PROGRAM AND OUTPUT DATA MANAGING PROGRAM, AND OUTPUT METHOD

(75) Inventors: Akihito Fukao, Chino (JP); Hiroaki Sakai, Chino (JP)

(73) Assignee: Seiko Epson Corporation (JP)

( * ) Notice: Subject to any disclaimer, the term of this patent is extended or adjusted under 35 U.S.C. 154(b) by 1212 days.

(21) Appl. No.: 11/254,167

(22) Filed: Oct. 19, 2005

(65) Prior Publication Data

US 2006/0095445 A1    May 4, 2006

(30) Foreign Application Priority Data

Oct. 22, 2004   (JP)   ............................. 2004-307745
Aug. 8, 2005    (JP)   ............................. 2005-229310

(51) Int. Cl.
*G06F 3/12*     (2006.01)
*G06F 12/14*    (2006.01)

(52) U.S. Cl. .................... 358/1.15; 358/1.16; 358/1.13; 707/100; 709/228; 726/9; 726/17

(58) Field of Classification Search ................ 358/1.15; 726/17
See application file for complete search history.

(56) References Cited

U.S. PATENT DOCUMENTS

| 5,638,511 | A | * | 6/1997 | Nezu .............................. 726/5 |
| 6,542,740 | B1 | * | 4/2003 | Olgaard et al. ........... 455/432.1 |
| 2002/0016833 | A1 | * | 2/2002 | Yajima et al. ............... 709/220 |
| 2003/0018900 | A1 | * | 1/2003 | Endoh ......................... 713/182 |
| 2003/0107762 | A1 | * | 6/2003 | Kinoshita et al. ........... 358/1.15 |
| 2004/0010567 | A1 | * | 1/2004 | Moyer et al. ................. 709/219 |
| 2004/0057068 | A1 | * | 3/2004 | Kadowaki .................. 358/1.13 |

FOREIGN PATENT DOCUMENTS

| JP | 09-149168 | 6/1997 |
| JP | 11-353137 | 12/1999 |
| JP | 2000-047534 | 2/2000 |
| JP | 2002-149385 | 5/2002 |
| JP | 2004-086766 | 3/2004 |
| JP | 2004-118232 | 4/2004 |

* cited by examiner

*Primary Examiner*—Mark K Zimmerman
*Assistant Examiner*—Huo Long Chen
(74) *Attorney, Agent, or Firm*—Harness, Dickey & Pierce, P.L.C.

(57) ABSTRACT

An output system includes a network device for performing an output on the basis of output data and an output data managing device for managing the output data, wherein: the network device and the output data managing device are communicably connected and the network device performs the output.

8 Claims, 13 Drawing Sheets

| JOB ID | PRINT DATA NAME | PRINTING STATE | USER IDENTIFICATION INFORMATION | DRIVER IDENTIFICATION INFORMATION |
|---|---|---|---|---|
| 01 | prnjob01.dat | 3/20 | 01230001 | PrinterDriver1 |
| 02 | prnjob02.dat | 4/5 | 01230002 | PrinterDriver2 |
| 03 | prnjob03.dat | 4/10 | 01230003 | – |
| | | | | |
| | | | | |

# OUTPUT SYSTEM, NETWORK DEVICE, OUTPUT DATA MANAGING DEVICE, OUTPUT PROGRAM AND OUTPUT DATA MANAGING PROGRAM, AND OUTPUT METHOD

RELATED APPLICATIONS

This application claims priority to Japanese Patent Application Nos. 2004-307745 filed Oct. 22, 2004 and 2005-229310 filed Aug. 8, 2005 which are hereby expressly incorporated by reference herein in their entirety.

BACKGROUND

1. Technical Field

The present invention relates to a system, a device, an apparatus, a program, and a method for performing the output of printing, etc. on the basis of output data, and particularly, relates to an output system, a network device, an output data managing device, an output program, an output data managing program, and an output method suitable for the improvement of security and the improvement of a degree of freedom for changing an output destination.

2. Related Art

When printing is performed by a network printer and the host terminal of a user exists in a place separated from the network printer, there is a possibility that the contents of a printed matter are seen by others while the user goes to the place of the network printer. There is a problem when a confidential document not desirous to be seen by others is printed. Therefore, it is desirably required to arrange a security function in the network printer.

For example, a printing system disclosed in JP-A-11-353137 and an image forming apparatus described in JP-A-2002-149385 are formerly known as techniques for improving the security of the network printer.

In the invention described in JP-A-11-353137, when a document is printed from a host terminal, a print command with a password number is first transmitted to the network printer. In the network printer, the received print command is developed to an image of a page in a frame memory, and is then data-compressed and accumulated. The user then actually comes to the arranging place of the network printer and inputs the password number to the network printer. At that time, print processing is started for the first time by using the accumulated compressed data. When the total amount of the compressed data exceeds the capacity of the accumulation in the network printer, the compressed data are deleted from the compressed data of a job previously accumulated.

In the invention described in JP-A-2002-149385, when a print job of a confidential print mode is received and no printable state is attained at present, this print job is transferred to another network printer. In this case, the print job is transferred in a compulsory print mode only in a case in which the network printer of a transfer destination is closely located and it is a state able to be immediately printed out. In contrast to this, when the network printer of the transfer destination is distantly located or no print-out operation can be immediately performed even in a close place, the print job is again transferred by the confidential print mode. Thus, even when a problem such as a paper jam, etc. is generated in the network printer requesting the print, the printed matter can be reliably acquired by another network printer.

However, in the invention described in JP-A-11-353137, when the password number is once inputted to the network printer, the printing is continued until the printing is completed. Therefore, when the situation arises that the user must separate from the place of the network printer on the way to the printing, a problem exists in that there is a possibility that the contents of the printed matter are seen by others.

Further, in the invention described in JP-A-2002-149385, when no printable state is attained at present, the print job is transferred to another network printer. Therefore, it is impossible to cope with a case in which the user must perform the printing by another network printer. Accordingly, in the print processing based on one print job, a problem exists in that the degree of freedom for changing the network printer as a printing destination is low.

Such a problem is not limited to the case for performing the printing by the network printer. For example, such a problem is similarly possible in a case in which a display device of a projector, an LCD (Liquid Crystal Display), etc. is connected to a network and display is performed by the display device, etc. For example, when the invention described in JP-A-11-353137 is applied to a system for performing display using the above projector and presentation is performed by using the projector and the situation arises that the user must separate from the projector on the way at any cost, etc., there is a fear that the problem that the contents of the presentation are freely seen by others is caused. Further, for example, when the invention described in JP-A-2002-149385 is applied to a system for performing display by using the above LCD and some information is intended to be referred by the LCD, the information is transferred to another LCD only when this LCD cannot be used due to a breakdown, etc. Therefore, when there is a request desirous to merely display the information by another LCD, there is a fear that the problem that this request cannot be satisfied is caused.

SUMMARY

Therefore, an advantage of some aspects of the invention is to provide an output system, a network device, an output data managing device, an output program, an output data managing program, and an output method suitable for the improvement of security and the improvement of the degree of freedom for changing an output destination.

Mode 1 To achieve the above advantage, the output system of mode 1 is an output system comprising a network device for performing an output on the basis of output data and an output data managing device for managing the output data, wherein: the network device and the output data managing device are communicably connected and the network device performs the output; wherein the output data managing device has an output data memory unit for storing the output data correspondingly to collated information; a collating information receiving unit for receiving collating information; an output data retrieving unit for retrieving the output data from the output data memory unit on the basis of the collating information received by the collating information receiving unit; and an output data transmitting unit for transmitting the output data retrieved and outputted by the output data retrieving unit to the network device; and the network device has a collating information reading unit for reading the collating information from a memory medium given to the network device; a collating information transmitting unit for transmitting the collating information read by the collating information reading unit to the output data managing device; an output data receiving unit for receiving the output data; an output unit for performing the output on the basis of the output data received by the output data receiving unit; and an output limit unit for allowing the output using the output unit only while the memory medium is given to the collating information reading unit.

In accordance with such a construction, when the memory medium storing the collating information is given in the network device, the collating information is read by the collating information reading unit from the memory medium given to the network device. The read collating information is transmitted to the output data managing device by the collating information transmitting unit.

When the collating information is received by the collating information receiving unit in the output data managing device, the output data are retrieved by the output data retrieving unit from the output data memory unit on the basis of the received collating information. As its result, when the pertinent output data are retrieved and outputted, the retrieved and outputted output data are transmitted to the network device by the output data transmitting unit.

When the output data are received by the output data receiving unit in the network device, the output is performed by the output unit on the basis of the received output data. At this time, the output using the output unit is allowed by the output limit unit only while the memory medium is given to the collating information reading unit.

Thus, for example, the output is performed if a user gives the memory medium. The output is interrupted if the user detaches the memory medium. Hence, even when a situation in which the user must separate from the place of the network device during the output is caused, it is possible to reduce a possibility that output contents are seen by others. Accordingly, in comparison with the former case, the effect of being able to improve security is obtained.

Here, the output unit may be set to any construction if this construction is set so as to perform the output on the basis of the output data. For example, this output unit includes a printing unit for performing printing on the basis of print data, a display unit for performing display on the basis of display data, or a sound output unit for outputting a voice on the basis of voice data. For example, a projector and LCD are used as the display unit. Hereinafter, the same contents also hold true in the network device of mode 7.

The collating information is information for retrieving the output data by collation with collated information. The collating information may be the same information as the collated information, and may be also information different from the collated information. For example, in the retrieval of the output data, it is judged whether the collating information and the collated information satisfy a predetermined relation or not. When it is judged that the predetermined relation is satisfied, the output data corresponding to the pertinent collated information are acquired from the output data memory unit. Here, for example, the satisfaction of the predetermined relation is that the collating information and the collated information are conformed to each other, that a result obtained by performing an arithmetic operation by a predetermined arithmetic formula by using the collating information is conformed to the collated information, or that the result obtained by performing the arithmetic operation by the predetermined arithmetic formula by using the collating information and a result obtained by performing the arithmetic operation by the predetermined arithmetic formula by using the collated information are conformed to each other. Hereinafter, the same contents also hold true in the network device of mode 7, the output data managing device of mode 10, the output control program of mode 14, the output data managing program of mode 17, and the output method of mode 21.

"Given" is to set a state in which a collating information reading section can read the collating information stored to the memory medium. For example, "given" is to set a state in which the memory medium is arranged in a reading position of the reading section of a contact type or a noncontact type arranged in the collating information reading unit in a state able to read the collating information stored to this memory medium. "Given" is also to set a state in which one portion or all portions of the memory medium are inserted into an insertion-passing portion of an insertion-passing type reading section of a contact type or a noncontact type arranged in the collating information reading unit in a state able to read the collating information stored to this memory medium. "Given" is also to set a state in which in which one portion or all portions of the memory medium are inserted into an insertion portion of an insertion type reading section of a contact type or a noncontact type arranged in the collating information reading unit in a state able to read the collating information stored to this memory medium. "Given" is also to set a state in which the memory medium approaches the reading section of a noncontact type arranged in the collating information reading unit until a distance able to read the collating information stored to this memory medium by the above reading section. Hereinafter, the same contents also hold true in the network device of mode 7, the output data managing device of mode 10, the output control program of mode 14, the output data managing program of mode 17, and the output method of mode 21.

The memory medium is a memory medium for storing authentication information. The memory medium includes all memory media if these memory media are a semiconductor memory medium of RAM, ROM, etc., a magnetic memory type memory medium of FD, HD, etc., an optical reading system memory medium of CD, CDV, LD, DVD, etc., a magnetic memory type/optical reading system memory medium of MO, etc., and are memory media readable by a computer irrespective of electronic, magnetic, optical reading methods, etc. Hereinafter, the same contents also hold true in the network device of mode 7, the output data managing device of mode 10, the output control program of mode 14, the output data managing program of mode 17, and the output method of mode 21.

The output data memory unit stores the output data and the collated information by all means in all periods. In the output data memory unit, the output data or the collated information may be stored in advance, or may be also stored by an input, etc. from the exterior at an operating time of the present system without storing the output data or the collated information in advance. Hereinafter, the same contents also hold true in the network device of mode 7.

The output data managing device can be constructed as a device utilizing apparatus for utilizing the network device, a server, and other terminals. Therefore, an output data memory unit of comparatively large memory capacity can be utilized. In addition, the memory capacity of the output data memory unit can be easily enlarged. Accordingly, when many output requests are simultaneously generated, it is possible to reduce a possibility that unprocessed output data are deleted. Hence, the effect of being able to reduce the possibility that no output is performed is obtained. Hereinafter, the same contents also hold true in the output data managing device of mode 10, the output data managing program of mode 17, and the output method of mode 21.

Mode 2 In the output system of mode 1, the output system of mode 2 is characterized in that a plurality of the network devices are communicably connected;

the output limit unit interrupts the output using the output unit when the memory medium is detached from the collating information reading unit; and the output unit of the network device given with respect to the memory medium restarts the output from an interrupting portion for interrupting the output when the memory medium is given.

In accordance with such a construction, when the memory medium is detached from the collating information reading unit in the network device, the output using the output unit is interrupted by the output limit unit.

For example, when a user wants to change an output destination to another network device, the user goes to the place of another network device, and gives the memory medium.

When the memory medium is given in another network device, the output data are received via collation using the output data managing device, and the output is restarted from the interrupting portion by the output unit on the basis of the received output data.

Thus, for example, the output is interrupted if the user detaches the memory medium. The output is restarted if the user gives the memory medium to another network device. Accordingly, in comparison with the former case, the effect of being able to improve the degree of freedom for changing the network device as an output destination is obtained in output processing based on one output data.

Here, to restart the interrupted output, the memory medium given to the network device interrupted in the output, or the above another network device different from the network device interrupted in the output may be the same as the memory medium given to the network device interrupted in the output, and may be also another memory medium if the same authentication information as this memory medium is stored. Hereinafter, the same contents also hold true in the network device of mode 8, the output control program of mode 15, and the output method of mode 22.

Mode 3 In the output system of mode 2, the output system of mode 3 is characterized in that the output data managing device has an output state information memory unit for storing output state information showing an advancing state of the output; an output passage information receiving unit for receiving output passage information showing output passage of the output unit; an output state information updating unit for updating the output state information of the output state information memory unit on the basis of the output passage information received by the output passage information receiving unit; and an output state information transmitting unit for transmitting the output state information of the output state information memory unit to the network device;

the network device has an output passage information transmitting unit for transmitting the output passage information to the output data managing device; and an output state information receiving unit for receiving the output state information; and the output unit restarts the output from the interrupting portion on the basis of the output state information received by the output state information receiving unit and the output data.

In accordance with such a construction, the output passage information is transmitted to the output data managing device by the output passage information transmitting unit in the network device.

When the output passage information is received by the output passage information receiving unit in the output data managing device, the output state information of the output state information memory unit is updated by the output state information updating unit on the basis of the received output passage information. Further, the output state information of the output state information memory unit is transmitted to the network device by the output state information transmitting unit.

When the memory medium is given in the network device, the output data are received via collation using the output data managing device. Further, when the output state information is received by the output state information receiving unit, the output is restarted from the interrupting portion by the output unit on the basis of the received output state information and output data.

Thus, in the network device after the change, the effect that the output can be comparatively reliably restarted from the interrupting portion interrupted in the output or its vicinity in the network device before the change is obtained.

Further, the output state information memory unit stores the output state information in all means in all periods. The output state information may be stored in advance, and may be also stored by an input, etc. from the exterior at an operating time of the present system without storing the output state information in advance. Hereinafter, the same contents also hold true in the output data managing device of mode 10.

Mode 4 In the output system of mode 3, the output system of mode 4 is characterized in that the output passage information is information showing that the output of a page unit is completed; and the output state information transmitting unit transmits the output state information showing the page next to a page on which the output is completed.

In accordance with such a construction, the output state information showing the page next to a page completed in the output is transmitted by the output state information transmitting unit in the output data managing device.

Thus, the effect of being able to restart the output from the page next to the page completed in the output in the network device before the change is obtained in the network device after the change.

Mode 5 In the output system of any one of mode 1 to 4, the output system of mode 5 is characterized in that a device utilizing apparatus for utilizing the network device is communicably connected;

the device utilizing apparatus has an output data generating unit for generating the output data; and a second output data transmitting unit for transmitting the output data generated by the output data generating unit and the collated information to the output data managing device; and the output data managing device has a second output data receiving unit for receiving the output data and the collated information; and an output data registering unit for correspondingly registering the output data and the collated information received by the second output data receiving unit to the output data memory unit.

In accordance with such a construction, the output data are generated by the output data generating unit in the device utilizing apparatus. The generated output data and the collated information are transmitted to the output data managing device by the second output data transmitting unit.

When the output data and the collated information are received by the second output data receiving unit in the output data managing device, the received output data and collated information are correspondingly registered to the output data memory unit by the output data registering unit.

Here, the second output data receiving unit of this mode and the output data transmitting unit of mode 1 are set to separate unit, but may be also constructed separately or integrally as hardware.

Mode 6 In the output system of any one of mode 1 to 4, the output system of mode 6 is characterized in that the output data managing device has output data generating unit for generating the output data; and output data registering unit for registering the output data generated by the output data generating unit and the collated information to the output data memory unit.

In accordance with such a construction, the output data are generated by the output data generating unit in the output data managing device. The generated output data and the collated information are correspondingly registered to the output data memory unit by the output data registering unit.

Here, "register" is to newly store the received output data and collated information to the output data memory unit. For example, "register" is to store the output data in a retrievable state with the collated information as a keyword, etc. Hereinafter, the same contents also hold true in the output data managing device of mode 12 or 13, the output data managing program of mode 19 or 20, or the output method of mode 25 or 26.

Mode 7 To achieve the above advantage, the network device of mode 7 is a network device for performing an output on the basis of output data and comprising:

a collating information reading unit for reading collating information from a memory medium given to the network device; a collating information transmitting unit for transmitting the collating information read by the collating information reading unit to an output data managing device; an output data receiving unit for receiving the output data; an output unit for performing the output on the basis of the output data received by the output data receiving unit; and an output limit unit for allowing the output using the output unit only while the memory medium is given to the collating information reading unit.

In accordance with such a construction, an action equal to that of the network device in the output system of mode 1 is obtained. Accordingly, an effect equal to that of the output system of mode 1 is obtained.

Mode 8 In the network device of mode 7, the network device of mode 8 is characterized in that the output limit unit interrupts the output using the output unit when the memory medium is detached from the collating information reading unit; and the output unit restarts the output from an interrupting portion for interrupting the output.

In accordance with such a construction, an action equal to that of the network device in the output system of mode 2 is obtained. Accordingly, an effect equal to that of the output system of mode 2 is obtained.

Mode 9 In the network device of mode 8, the network device of mode 9 is characterized in that the network device further comprises output passage information transmitting unit for transmitting output passage information showing output passage of the output unit to the output data managing device, and output state information receiving unit for receiving output state information showing an advancing state of the output, and the output unit restarts the output from the interrupting portion on the basis of the output state information received by the output state information receiving unit and the output data.

In accordance with such a construction, an action equal to that of the network device in the output system of mode 3 is obtained. Accordingly, an effect equal to that of the output system of mode 3 is obtained.

Mode 10 To achieve the above advantage, the output data managing device of mode 10 is an output data managing device for managing output data and comprising:

an output data memory unit for storing the output data correspondingly to collated information; a collating information receiving unit for receiving collating information; an output data retrieving unit for retrieving the output data from the output data memory unit on the basis of the collating information received by the collating information receiving unit; an output data transmitting unit for transmitting the output data retrieved and outputted by the output data retrieving unit to a network device; an output state information memory unit for storing output state information showing an advancing state of the output; an output passage information receiving unit for receiving output passage information showing output passage of the network device; an output state information updating unit for updating the output state information of the output state information memory unit on the basis of the output passage information received by the output passage information receiving unit; and an output state information transmitting unit for transmitting the output state information of the output state information memory unit to the network device.

In accordance with such a construction, an action equal to that of the output data managing device in the output system of mode 3 is obtained. Accordingly, an effect equal to that of the output system of mode 3 is obtained.

Mode 11 In the output data managing device of mode 10, the output data managing device of mode 11 is characterized in that the output passage information is information showing that the output of a page unit is completed; and the output state information transmitting unit transmits the output state information showing the page next to a page on which the output is completed.

In accordance with such a construction, an action equal to that of the output data managing device in the output system of mode 4 is obtained. Accordingly, an effect equal to that of the output system of mode 4 is obtained.

Mode 12 In the output data managing device of any one of modes 10 and 11, the output data managing device of mode 12 is characterized in that the output data managing device has a second output data receiving unit for receiving the output data and the collated information; and output data registering unit for correspondingly registering the output data and the collated information received by the second output data receiving unit to the output data memory unit.

In accordance with such a construction, an action equal to that of the output data managing device in the output system of mode 5 is obtained. Accordingly, an effect equal to that of the output system of mode 5 is obtained.

Mode 13 In the output data managing device of any one of modes 10 and 11, the output data managing device of mode 13 is characterized in that the output data managing device has an output data generating unit for generating the output data; and an output data registering unit for registering the output data generated by the output data generating unit and the collated information to the output data memory unit.

In accordance with such a construction, an action equal to that of the output data managing device in the output system of mode 6 is obtained. Accordingly, an effect equal to that of the output system of mode 6 is obtained.

Mode 14 To achieve the above advantage, the output control program of mode 14 is an output control program for performing an output on the basis of output data and including:

a program for making a computer execute processings constructed by a collating information reading step for reading collating information by a collating information reader from a memory medium given to a network device; a collating information transmitting step for transmitting the collating information read by the collating information reading step to an output data managing device; an output data receiving step for receiving the output data; an output step for performing the output on the basis of the output data received in the output data receiving step; and an output limit step for allowing the output in the output step only while the memory medium is given to the collating information reader.

In accordance with such a construction, when the program is read by the computer and the computer executes the processings in accordance with the read program, an action and an effect equal to those of the network device of mode 7 are obtained.

Here, the output step may be set to any mode if the output is performed on the basis of the output data. For example, the output step includes a printing step for performing printing on the basis of print data, a display step for performing display on the basis of display data, or a sound output step for outputting a sound on the basis of voice data. For example, the display step is to perform the display by a projector and LCD. Hereinafter, the same contents also hold true in the output method of mode 21.

Mode 15 In the output control program of mode 14, the output control program of mode 15 is characterized in that the output in the output step is interrupted in the output limit step when the memory medium is detached from the collating information reader; and the output is restarted from an interrupting portion for interrupting the output in the output step.

In accordance with such a construction, when the program is read by the computer and the computer executes the processings in accordance with the read program, an action and an effect equal to those of the network device of mode 8 are obtained.

Mode 16 Further, in the output control program of mode 15, the output control program of mode 16 is characterized in that the output control program includes a program for making the computer execute processings constructed by an output passage information transmitting step for transmitting output passage information showing output passage in the output step to the output data managing device, and an output state information receiving step for receiving output state information showing an advancing state of the output, and the output is restarted from the interrupting portion in the output step on the basis of the output state information received in the output state information receiving step and the output data.

In accordance with such a construction, when the program is read by the computer and the computer executes the processings in accordance with the read program, an action and an effect equal to those of the network device of mode 9 are obtained.

Mode 17 To achieve the above advantage, the output data managing program of mode 17 is an output data managing program for managing output data and including:

a program for making a computer execute processings constructed by a collating information receiving step for receiving collating information; an output data retrieving step for retrieving the output data from output data memory unit for storing the output data correspondingly to collated information on the basis of the collating information received in the collating information receiving step; an output data transmitting step for transmitting the output data retrieved and outputted in the output data retrieving step to a network device; an output passage information receiving step for receiving output passage information showing output passage of the network device; an output state information updating step for updating output state information of output state information memory unit for storing the output state information showing an advancing state of the output on the basis of the output passage information received in the output passage information receiving step; and an output state information transmitting step for transmitting the output state information of the output state information memory unit to the network device.

In accordance with such a construction, when the program is read by the computer and the computer executes the processings in accordance with the read program, an action and an effect equal to those of the output data managing device of mode 10 are obtained.

Mode 18 In the output data managing program of mode 17, the output data managing program of mode 18 is characterized in that the output passage information is information showing that the output of a page unit is completed; and the output state information showing the page next to a page on which the output is completed is transmitted in the output state information transmitting step.

In accordance with such a construction, when the program is read by the computer and the computer executes the processings in accordance with the read program, an action and an effect equal to those of the output data managing device of mode 11 are obtained.

Mode 19 In the output data managing program of any one of modes 17 and 18, the output data managing program of mode 19 is characterized in that the output data managing program includes a program for making a computer execute processings constructed by a second output data receiving step for receiving the output data and the collated information; and an output data registering step for correspondingly registering the output data and the collated information received in the second output data receiving step to the output data memory unit.

In accordance with such a construction, when the program is read by the computer and the computer executes the processings in accordance with the read program, an action and an effect equal to those of the output data managing device of mode 12 are obtained.

Mode 20 In the output data managing program of any one of modes 17 and 18, the output data managing program of mode 20 is characterized in that the output data managing program includes a program for making a computer execute processings constructed by an output data generating step for generating the output data; and an output data registering step for registering the output data generated in the output data generating step and the collated information to the output data memory unit.

In accordance with such a construction, when the program is read by the computer and the computer executes the processings in accordance with the read program, an action and an effect equal to those of the output data managing device of mode 13 are obtained.

Mode 21 To achieve the above advantage, the output method of mode 21 is an output method for communicably connecting a network device for performing an output on the basis of output data, and an output data managing device for managing the output data, and performing the output by the network device, wherein:

with respect to the network device, the output method includes a collating information reading step for reading collating information by a collating information reader from a memory medium given to the network device; and a collating information transmitting step for transmitting the collating information read in the collating information reading step to the output data managing device;

with respect to the output data managing device, the output method includes a collating information receiving step for receiving the collating information; an output data retrieving step for retrieving the output data from output data memory unit for storing the output data correspondingly to collated information on the basis of the collating information received in the collating information receiving step; and an output data transmitting step for transmitting the output data retrieved and outputted in the output data retrieving step to the network device; and with respect to the network device, the output method includes an output data receiving step for receiving the output data; an output step for performing the output on the basis of the output data received in the output data receiving step; and an output limit step for allowing the output in the output step only while the memory medium is given to the collating information reader.

Thus, an effect equal to that of the output system of mode 1 is obtained.

Mode 22 In the output method of mode 21, the output method of mode 22 is characterized in that a plurality of the network devices are communicably connected;

the output in the output step is interrupted in the output limit step when the memory medium is detached from the collating information reader; and the output is restarted from an interrupting portion for interrupting the output in the output step.

Thus, an effect equal to that of the output system of mode 2 is obtained.

Mode 23 Further, in the output method of mode 22, the output method of mode 23 is characterized in that with respect to the network device, the output method includes an output passage information transmitting step for transmitting the output passage information showing output passage in the output step to the output data managing device;

with respect to the output data managing device, the output method includes an output passage information receiving step for receiving the output passage information; an output state information updating step for updating output state information of an output state information memory unit for storing the output state information showing an advancing state of the output on the basis of the output passage information received in the output passage information receiving step; and an output state information transmitting step for transmitting the output state information of the output state information memory unit to the network device;

with respect to the network device, the output method includes an output state information receiving step for receiving the output state information, and the output is restarted from the interrupting portion in the output step on the basis of the output state information received in the output state information receiving step and the output data.

Thus, an effect equal to that of the output system of mode 3 is obtained.

Mode 24 In the output method of mode 23, the output method of mode 24 is characterized in that the output passage information is information showing that the output of a page unit is completed; and the output state information showing the page next to a page on which the output is completed is transmitted in the output state information transmitting step.

Thus, an effect equal to that of the output system of mode 4 is obtained.

Mode 25 In the output method of any one of modes 21 to 24, the output method of mode 25 is characterized in that a device utilizing apparatus for utilizing the network device is communicably connected;

with respect to the device utilizing apparatus, the output method includes an output data generating step for generating the output data; and a second output data transmitting step for transmitting the output data generated in the output data generating step and the collated information to the output data managing device; and with respect to the output data managing device, the output method includes a second output data receiving step for receiving the output data and the collated information; and an output data registering step for correspondingly registering the output data and the collated information received in the second output data receiving step to the output data memory unit.

Thus, an effect equal to that of the output system of mode 5 is obtained.

Mode 26 In the output method of any one of modes 21 to 24, the output method of mode 26 is characterized in that with respect to the output data managing device, the output method includes an output data generating step for generating the output data; and an output data registering step for registering the output data generated in the output data generating step and the collated information to the output data memory unit.

Thus, an effect equal to that of the output system of mode 6 is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

The embodiment modes of the invention will next be explained with reference to the drawings. FIGS. 1 to 15 are views showing the embodiment modes of an output system, a network device, an output data managing device, an output program and an output data managing program, and an output method in the invention.

Figure 1:
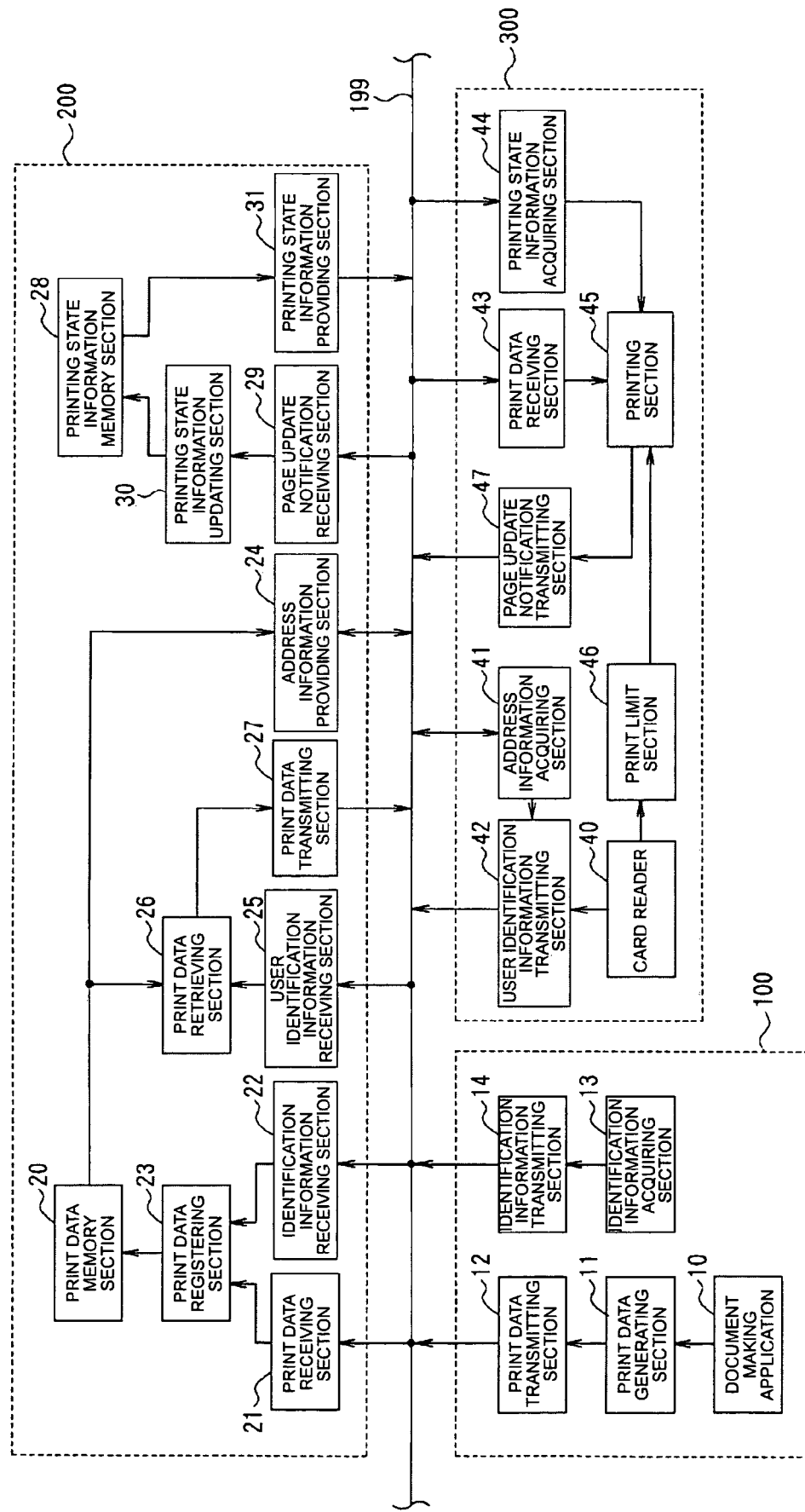
FIG. 1 is a functional block diagram schematically showing the function of a network system.

In the present embodiment modes, as shown in FIG. 1, the output system, the network device, the output data managing device, the output program and the output data managing program, and the output method in the invention are applied to a case in which printing is performed by a network printer 300 by utilizing an authentication card.

The function of a network system applying the invention thereto will be first schematically explained with reference to FIG. 1.

FIG. 1 is a functional block diagram schematically showing the function of the network system.

As shown in FIG. 1, plural host terminals 100, plural printer servers 200 and plural network printers 300 are connected to a network 199.

The host terminal 100 is constructed by arranging a document making application 10 able to edit document data by a user, a print data generating section 11 for generating print data on the basis of the document data edited by the document making application 10, and a print data transmitting section 12 for transmitting the print data generated by the print data generating section 11 to the printer server 200.

The host terminal 100 is further constructed by arranging an identification information acquiring section 13 for acquiring user identification information of the user utilizing the host terminal 100 at present and driver identification information relating to a printer driver of the network printer 300 utilized by the host terminal 100, and an identification information transmitting section 14 for transmitting the user identification information and the driver identification information acquired in the identification information acquiring section 13 to the printer server 200.

The printer server 200 is constructed by arranging a print data memory section 20, a print data receiving section 21 for receiving print data, an identification information receiving section 22 for receiving the user identification information and the driver identification information, and a print data registering section 23 for registering the print data received by the print data receiving section 21 to the print data memory section 20 correspondingly to the user identification information and the driver identification information received by the identification information receiving section 22.

The printer server 200 is further constructed by arranging an address information providing section 24 for providing address information of the printer server 200 to the network printer 300 in accordance with a response request from the network printer 300, a user identification information receiving section 25 for receiving the user identification information, a print data retrieving section 26 for retrieving the print data from the print data memory section 20 on the basis of the user identification information received by the user identification information receiving section 25, and a print data transmitting section 27 for transmitting the print data retrieved and outputted by the print data retrieving section 26 to the network printer 300.

The printer server 200 is further constructed by arranging a printing state information memory section 28 for storing printing state information showing an advancing state (hereinafter called a printing state) of the printing, a page update notification receiving section 29 for receiving a page update notification showing the completion of the printing of a page unit, a printing state information updating section 30 for updating the printing state information of the printing state information memory section 28 on the basis of the page update notification received by the page update notification receiving section 29, and a printing state information providing section 31 for providing the printing state information of the printing state information memory section 28 to the network printer 300.

The network printer 300 is constructed by arranging a card reader 40 for reading the user identification information from an authentication card constructed by an IC card, etc., an address information acquiring section 41 for transmitting a response request by broadcast communication and acquiring address information from the printer server 200, and a user identification information transmitting section 42 for transmitting the user identification information read by the card reader 40 to the printer server 200, on the basis of the address information acquired by the address information acquiring section 41.

The network printer 300 is further constructed by arranging a print data receiving section 43 for receiving the print data, a printing state information acquiring section 44 for acquiring the printing state information from the printer server 200, a printing section 45 for performing the printing on the basis of the print data received by the print data receiving section 43 and the printing state information acquired by the printing state information acquiring section 44, a printing limit section 46 for allowing the printing using the printing section 45 only while the authentication card is inserted into the card reader 40, and a page update notification transmitting section 47 for transmitting the page update notification to the printer server 200.

The construction of the host terminal 100 will next be explained.

Figure 2:
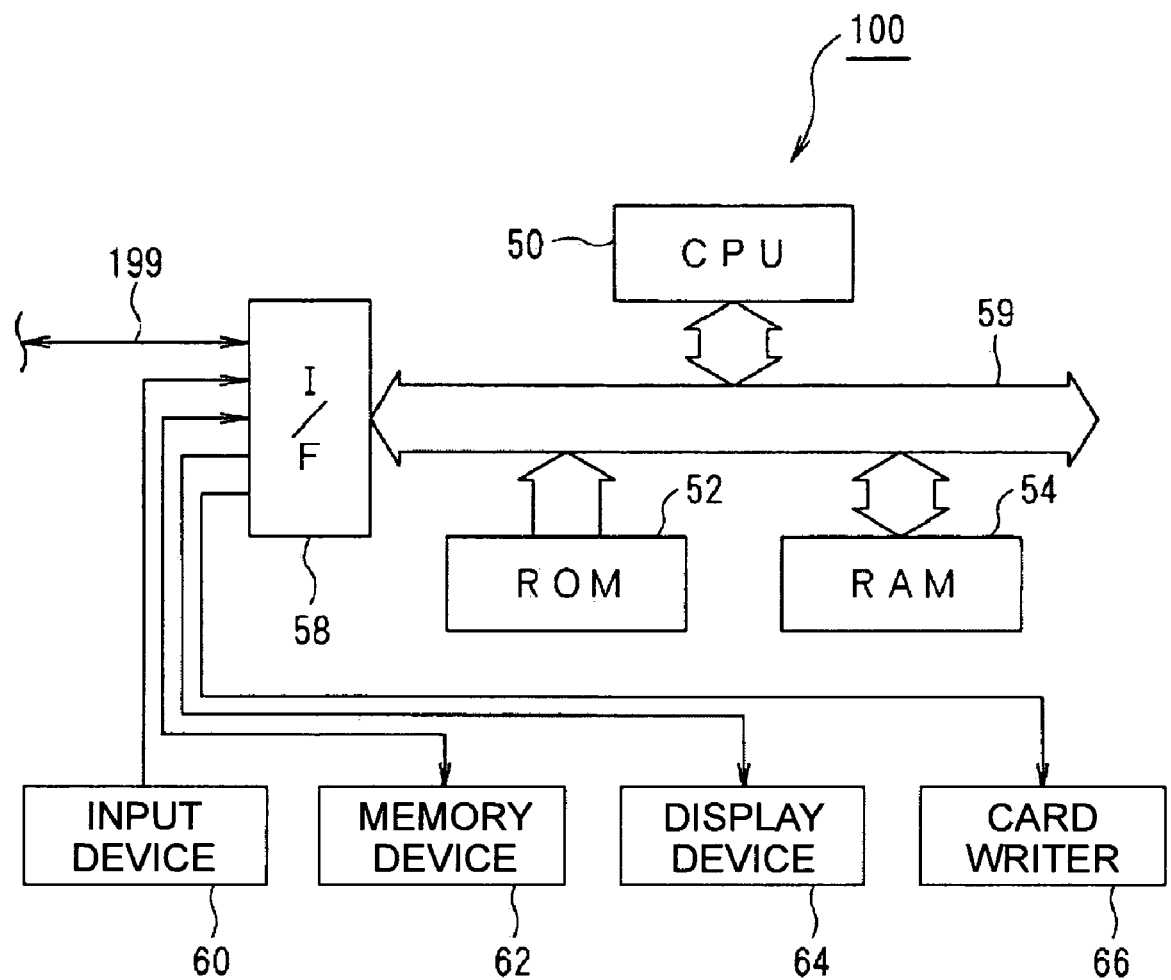
FIG. 2 is a block diagram showing the hardware construction of a host terminal 100.

FIG. 2 is a block diagram showing the hardware construction of the host terminal 100.

As shown in FIG. 2, the host terminal 100 is constructed by a CPU 50 for controlling an arithmetic operation and the operation of the entire system on the basis of a control program, a ROM 52 for storing the control program, etc. of the CPU 50 to a predetermined area in advance, a RAM 54 for storing data read out of the ROM 52, etc. and an arithmetic result required in an arithmetic process of the CPU 50, and an I/F 58 for mediating the input and output of data with respect to an external device. These elements are mutually connected by a bus 59 as a signal line for transferring data so as to transmit and receive data.

An input device 60 constructed by a keyboard, a mouse, etc. able to input data as a human interface, a memory device 62 for storing data, a table, etc. as a file, a display device 64 for displaying a screen on the basis of an image signal, a card writer 66 for writing the user identification information to the inserted authentication card, and a signal line for connection to the network 199 are connected to the I/F 58 as the external device.

The CPU 50 is constructed by a micro processing unit, etc., and starts a predetermined program stored to a predetermined area of the ROM 52. In accordance with this program, the CPU 50 executes each of print request processing and identification information provision processing shown in the flow charts of FIGS. 3 and 4 in time division.

The print request processing will first be explained in detail with reference to FIG. 3.

Figure 3:
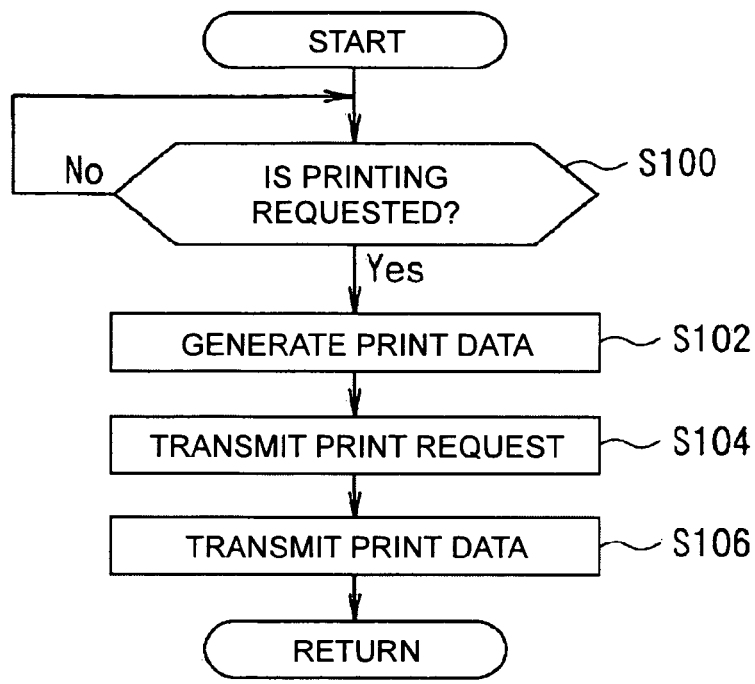
FIG. 3 is a flow chart showing print request processing.

FIG. 3 is a flow chart showing the print request processing.

The print request processing is processing for requesting printing from the printer server 200. When the print request processing is executed in the CPU 50, it first proceeds to step S100 as shown in FIG. 3.

In step S100, it is judged whether the printing is requested from the document making application 10 or not. When it is judged that the printing is requested (Yes), it proceeds to step S102. In contrast to this, when it is judged that no printing is requested (No), it waits in step S100 until the printing is requested.

In step S102, print data are generated by the printer driver on the basis of document data edited by the document making application 10. It then proceeds to step S104, and the print request is transmitted to the printer server 200, and it proceeds to step S106. In this step, the generated print data are transmitted to the printer server 200. A series of processings is then terminated and it is returned to the original processing.

Next, the identification information provision processing will be explained in detail with reference to FIG. 4.

Figure 4:
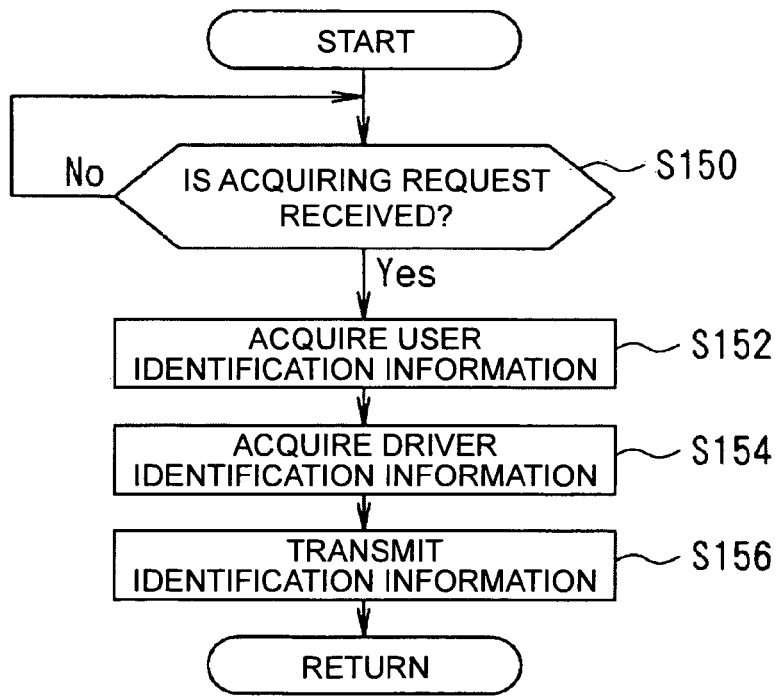
FIG. 4 is a flow chart showing identification information provision processing.

FIG. 4 is a flow chart showing the identification information provision processing.

The identification information provision processing is processing for providing the user identification information and the driver identification information to the printer server 200 in accordance with a request from the printer server 200. When this identification information provision processing is executed in the CPU 50, it first proceeds to step S150 as shown in FIG. 4.

In step S150, it is judged whether an acquiring request of the identification information is received or not. When it is judged that the acquiring request of the identification information is received (Yes), it proceeds to step S152. In contrast to this, when it is judged that no acquiring request is received (No), it waits in step S150 until the acquiring request of the identification information is received.

In step S152, the user identification information of the user utilizing the host terminal 100 at present is acquired, and it proceeds to step S154. In this step, the driver identification information relating to the printer driver utilized in the processing of step S102 is acquired, and it proceeds to step S156. In this step, the acquired user identification information and driver identification information are transmitted to the printer server 200 of a request source. A series of processings is thus terminated and it is returned to the original processing.

The construction of the printer server 200 will next be explained.

Figures 5, 6:
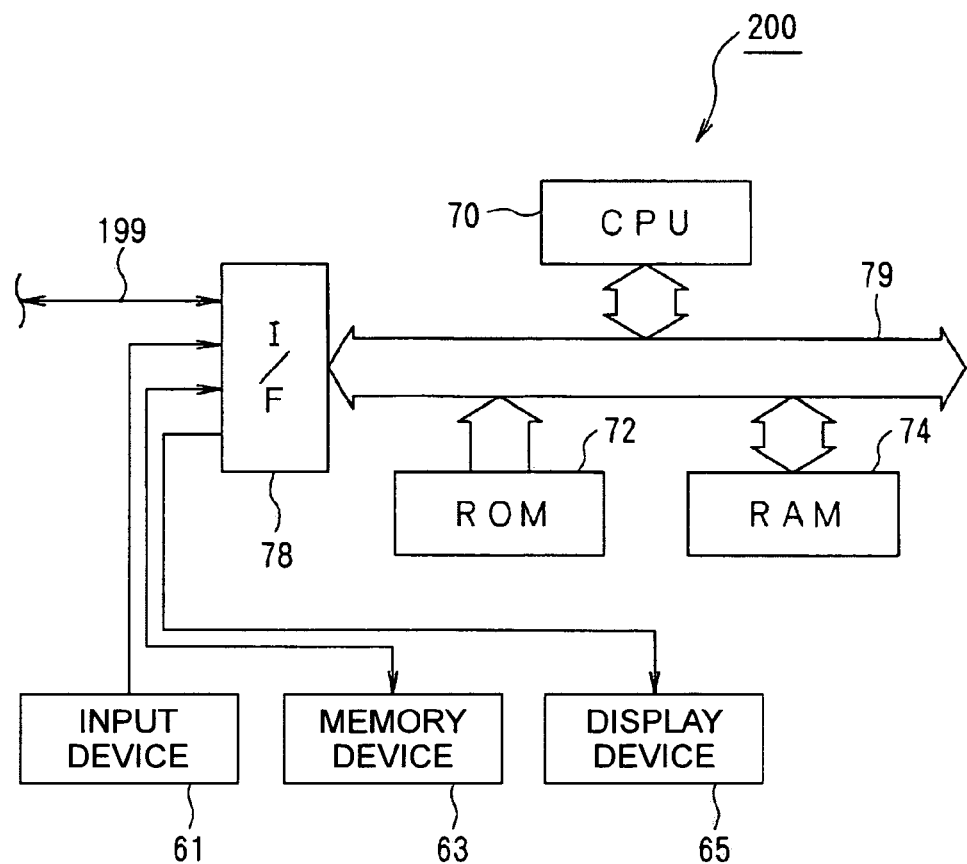
FIG. 5 is a block diagram showing the hardware construction of a printer server 200.
FIG. 6 is a view showing the data structure of a print data managing table 400.

FIG. 5 is a block diagram showing the hardware construction of the printer server 200.

As shown in FIG. 5, the printer server 200 is constructed by a CPU 70 for controlling an arithmetic operation and the operation of the entire system on the basis of a control program, a ROM 72 for storing the control program of the CPU 70, etc. to a predetermined area in advance, a RAM 74 for storing data read out of the ROM 72, etc. and an arithmetic result required in an arithmetic process of the CPU 70, and an I/F 78 for mediating the input and output of data with respect to an external device. These elements are mutually connected by a bus 79 as a signal line for transferring data so as to transmit and receive data.

An input device 61 constructed by a keyboard, a mouse, etc. able to input data as a human interface, a memory device 63 for storing data, a table, etc. as a file, a display device 65 for displaying a screen on the basis of an image signal, and a signal line for connection to the network 199 are connected to the I/F 78 as the external device.

The memory device 63 registers print data and stores a print data managing table 400 for managing the print data.

FIG. 6 is a view showing the data structure of the print data managing table 400.

One record every each print data is registered to the print data managing table 400. Each record is constructed by including a field 402 for registering a job ID for univocally discriminating the print data, a field 404 for registering a name of the print data, a field 406 for registering a printing state, a field 408 for registering the user identification information, and a field 410 for registering the driver identification information.

In the example of FIG. 6, in the record of a first paragraph end, "01" is registered as the job ID, and "prnjop01.dat" is registered as the name of the print data, and "3/20" is registered as the printing state. "01230001" is registered as the user identification information, and "PrinterDriver1" is registered as the driver identification information. These show that the print data of the job ID "01" are "prnjop01.dat" in name, and are made by the user of the user identification information "01230001" by utilizing the printer driver "PrinterDriver1". Further, these show that a total page number (entire page number×print copy number) is 20 and the printing of three pages among the 20 pages is completed in one network printer 300. A file name of the print data, and an address on the memory device 63 or the network 199 may be set as the name of the print data. Further, when a general printer driver is utilized or no printer driver is utilized, no registration of the driver identification information is necessarily required as in the record of a third stage.

The CPU 70 is constructed by a micro processing unit, etc., and starts a predetermined program stored to a predetermined area of the ROM 72. In accordance with this program, the CPU 70 executes each of print request reception processing, address information provision processing, print data provision processing, printing state information provision processing and print data managing table update processing shown in the flow charts of FIGS. 7 to 11 in time division.

The print request reception processing will first be explained in detail with reference to FIG. 7.

Figure 7:
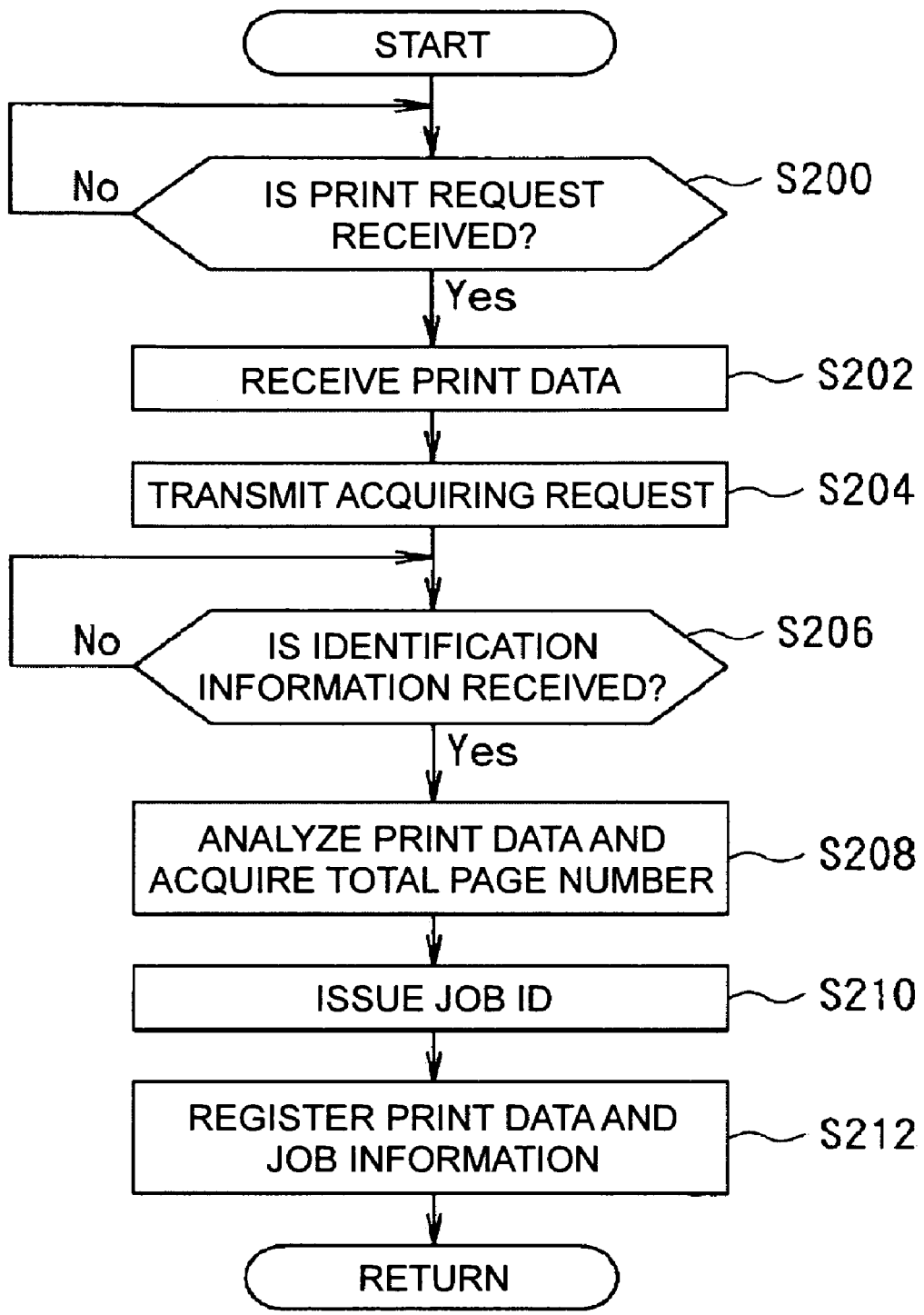
FIG. 7 is a flow chart showing print request reception processing.

FIG. 7 is a flow chart showing the print request reception processing.

The print request reception processing is processing for receiving a print request from the host terminal 100. When the print request reception processing is executed in the CPU 70, it first proceeds to step S200 as shown in FIG. 7.

In step S200, it is judged whether a print request is received or not. When it is judged that the print request is received (Yes), it proceeds to step S202. In contrast to this, when it is judged that no print request is received (No), it waits in step S200 until the print request is received.

In step S202, the print data are received and it proceeds to step S204. In this step, an acquiring request of the identification information is transmitted to the host terminal 100 of the request source, and it proceeds to step S206.

In step S206, it is judged whether the user identification information and the driver identification information are received or not. When it is judged that the user identification information and the driver identification information are received (Yes), it proceeds to step S208. In contrast to this, when it is judged that the user identification information and the driver identification information are not received (No), it waits in step S206 until the user identification information and the driver identification information are received.

In step S208, the received print data are analyzed and the total page number is acquired, and it proceeds to step S210. In this step, a job ID for univocally discriminating the received print data is issued and it proceeds to step S212.

In step S212, the received print data are registered to the memory device 63, and the issued job ID, the name of the received print data, the user identification information and the driver identification information are correspondingly set and are registered to the print data managing table 400. The printing state of the same record is initialized (0/total page number) on the basis of the acquired total page number, and a series of processings is terminated and it is returned to the original processing. Hereinafter, the information of each of fields 402 to 410 of the print data managing table 400 is called job information.

The address information provision processing will next be explained in detail with reference to FIG. 8.

Figure 8:
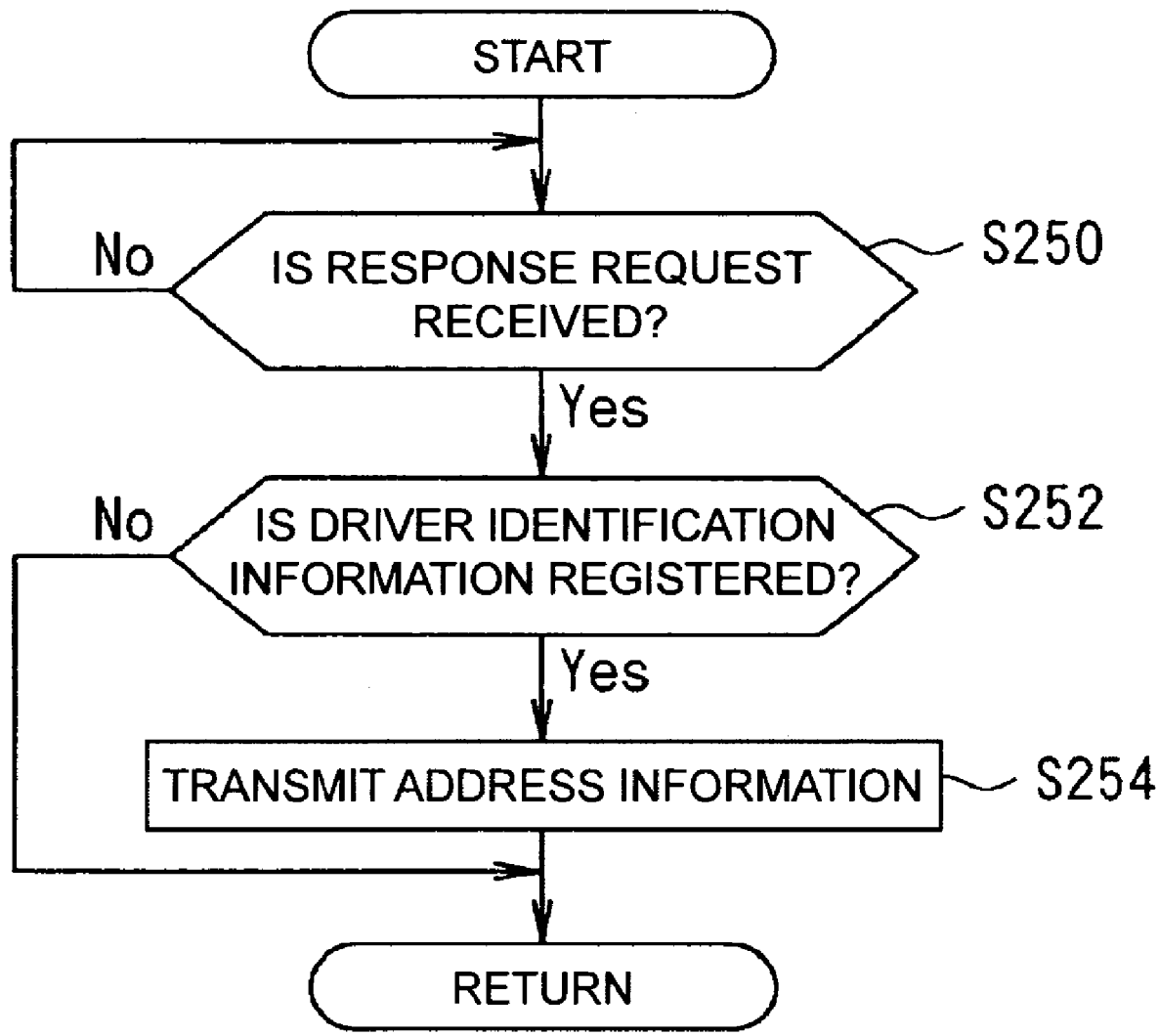
FIG. 8 is a flow chart showing address information provision processing.

FIG. 8 is a flow chart showing the address information provision processing.

The address information provision processing is processing for providing address information of the printer server 200 to the network printer 300 in accordance with a request from the network printer 300. When the address information provision processing is executed in the CPU 70, it first proceeds to step S250 as shown in FIG. 8.

In step S250, it is judged whether a response request is received or not. When it is judged that the response request is received (Yes), it proceeds to step S252. In contrast to this, when it is judged that no response request is received (No), it waits in step S250 until the response request is received.

In step S252, it is judged whether the driver identification information corresponding to the network printer 300 of a request source is registered to the print data managing table 400 or not. When it is judged that the corresponding driver identification information is registered (Yes), it proceeds to step S254. In this step, the address information showing a self network address is transmitted to the network printer 300 of the request source, and a series of processings is terminated and it is returned to the original processing.

In contrast to this, when it is judged in step S252 that no driver identification information corresponding to the network printer 300 of the request source is registered to the print data managing table 400 (No), a series of processings is terminated and it is returned to the original processing.

The print data provision processing will next be explained in detail with reference to FIG. 9.

Figure 9:
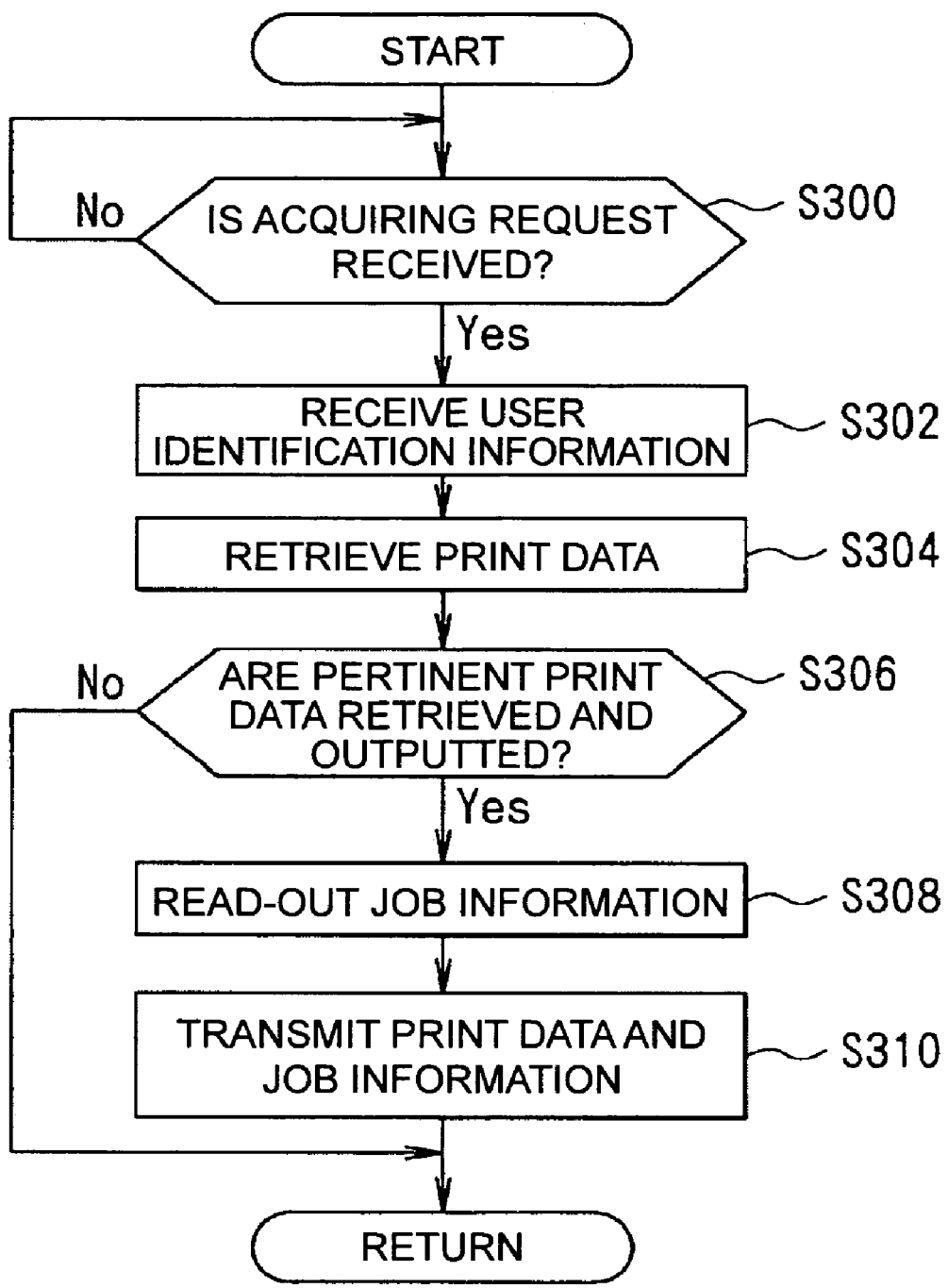
FIG. 9 is a flow chart showing print data provision processing.

FIG. 9 is a flow chart showing the print data provision processing.

The print data provision processing is processing for providing the print data to the network printer 300. When the print data provision processing is executed in the CPU 70, it first proceeds to step S300 as shown in FIG. 9.

In step S300, it is judged whether an acquiring request of the print data is received or not. When it is judged that the acquiring request of the print data is received (Yes), it proceeds to step S302. In contrast to this, when it is judged that no acquiring request is received (No), it waits in step S300 until the acquiring request of the print data is received.

In step S302, the user identification information is received and it proceeds to step S304. In this step, with reference to the print data managing table 400, the print data corresponding to the received user identification information are retrieved from the memory device 63, and it proceeds to step S306.

In step S306, it is judged whether the pertinent print data are retrieved and outputted or not. When it is judged that the pertinent print data are retrieved and outputted (Yes), it proceeds to step S308 and the job information corresponding to the retrieved and outputted print data is read out of the print data managing table 400. It then proceeds to step S310, and the retrieved and outputted print data and the read job information are transmitted to the network printer 300 of the request source. A series of processings is then terminated and it is returned to the original processing.

In contrast to this, when it is judged in step S306 that no pertinent print data can be retrieved and outputted (No), a series of processings is terminated and it is returned to the original processing.

The printing state information provision processing will next be explained in detail with reference to FIG. 10.

Figure 10:
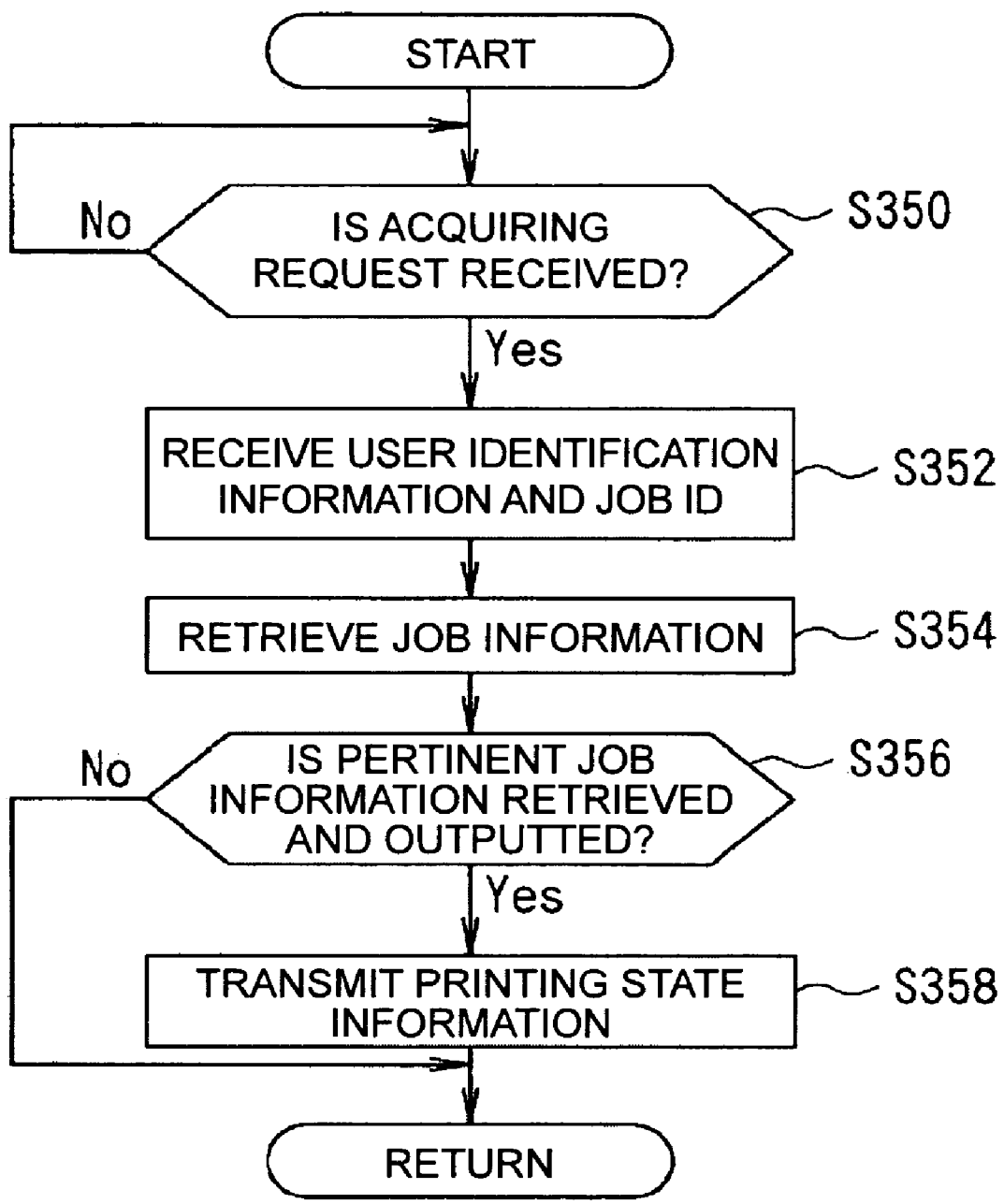
FIG. 10 is a flow chart showing printing state information provision processing.

FIG. 10 is a flow chart showing the printing state information provision processing.

The printing state information provision processing is processing for providing printing state information to the network printer 300. When the printing state information provision processing is executed in the CPU 70, it first proceeds to step S350 as shown in FIG. 10.

In step S350, it is judged whether an acquiring request of the printing state information is received or not. When it is judged that the acquiring request of the printing state information is received (Yes), it proceeds to step S352. In contrast to this, when it is judged that no acquiring request is received (No), it waits in step S350 until the acquiring request of the printing state information is received.

In step S352, the user identification information and the job ID are received, and it proceeds to step S354. In this step, job information corresponding to the received user identification information and job information is retrieved from the print data managing table 400, and it proceeds to step S356.

In step S356, it is judged whether the pertinent job information is retrieved and outputted or not. When it is judged that the pertinent job information is retrieved and outputted (Yes), it proceeds to step S358. In this step, the printing state information showing the printing state included in the retrieved and outputted job information is transmitted to the network printer 300 of the request source. A series of processings is then terminated and it is returned to the original processing.

In contrast to this, when it is judged in step S356 that no pertinent job information can be retrieved and outputted (No), a series of processings is terminated and it is returned to the original processing.

The print data managing table update processing will next be explained in detail with reference to FIG. 11.

Figure 11:
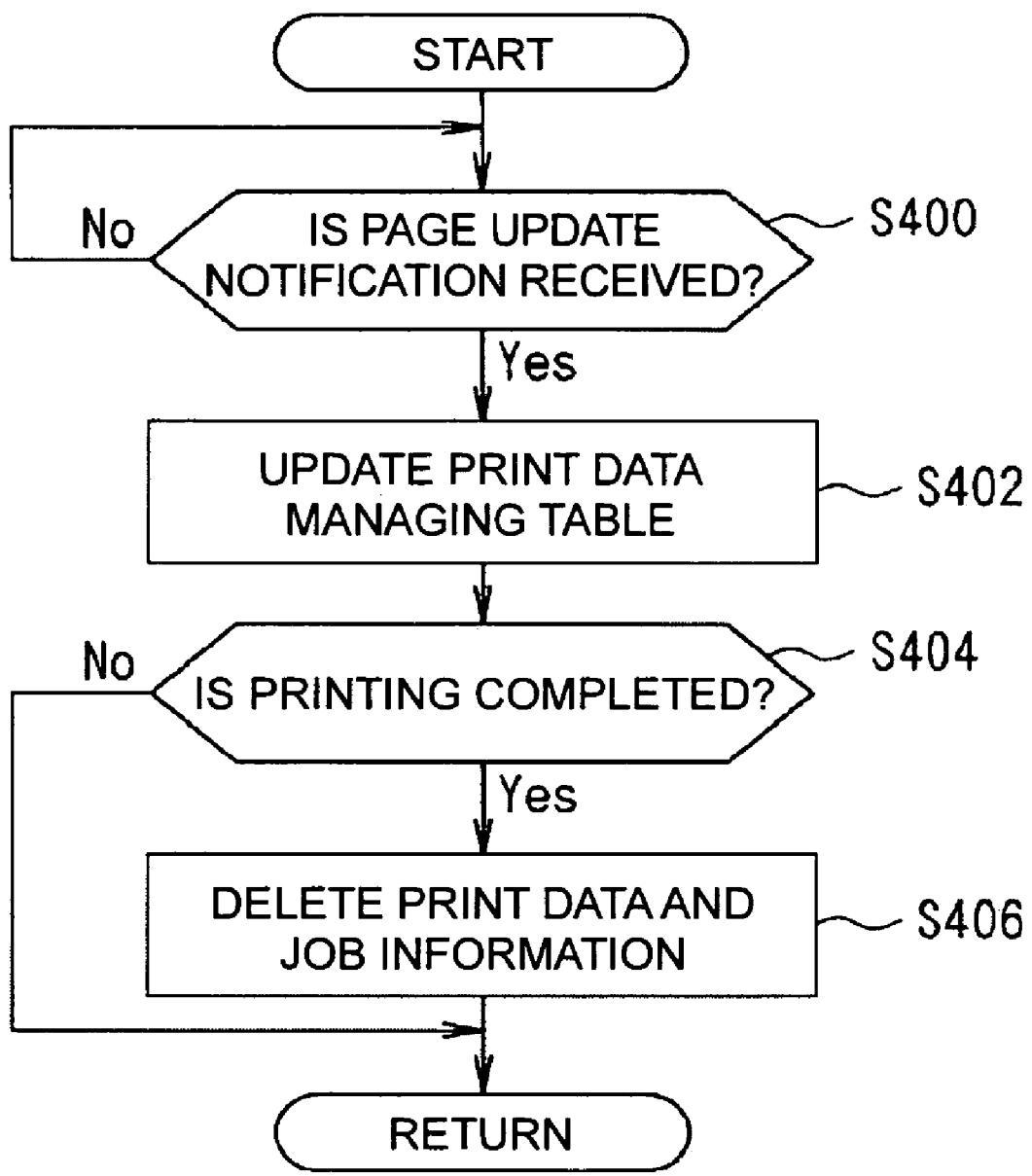
FIG. 11 is a flow chart showing print data managing table update processing.

FIG. 11 is a flow chart showing the print data managing table update processing.

The print data managing table update processing is processing for updating the print data managing table 400. When the print data managing table update processing is executed in the CPU 70, it first proceeds to step S400 as shown in FIG. 11.

In step S400, it is judged whether a page update notification including the user identification information and the job ID is received or not. When it is judged that the page update notification is received (Yes), it proceeds to step S402. In contrast to this, when it is judged that no page update notification is received (No), it waits in step S400 until the page update notification is received.

In step S402, the user identification information and the job ID are extracted from the received page update notification. The record corresponding to the extracted user identification information and job ID is retrieved from the print data managing table 400, and the printing state of the retrieved and outputted record is updated. The printing state is updated by adding "1" to a print completion page number.

Next, it proceeds to step S404 and it is judged whether the printing is completed or not by judging whether the print completion page number and the total page number are conformed to each other on the basis of the update result of the printing state or not. When it is judged that the printing is completed (Yes), it proceeds to step S406.

In step S406, with reference to the print data managing table 400, the print data corresponding to the received user identification information and job ID are deleted from the memory device 63. Further, the record corresponding to the received user identification information and job ID is deleted from the print data managing table 400, and a series of processings is terminated and it is returned to the original processing.

In contrast to this, when it is judged in step S404 that no printing is completed (No), a series of processings is terminated and it is returned to the original processing.

The construction of the network printer 300 will next be explained.

Figure 12:
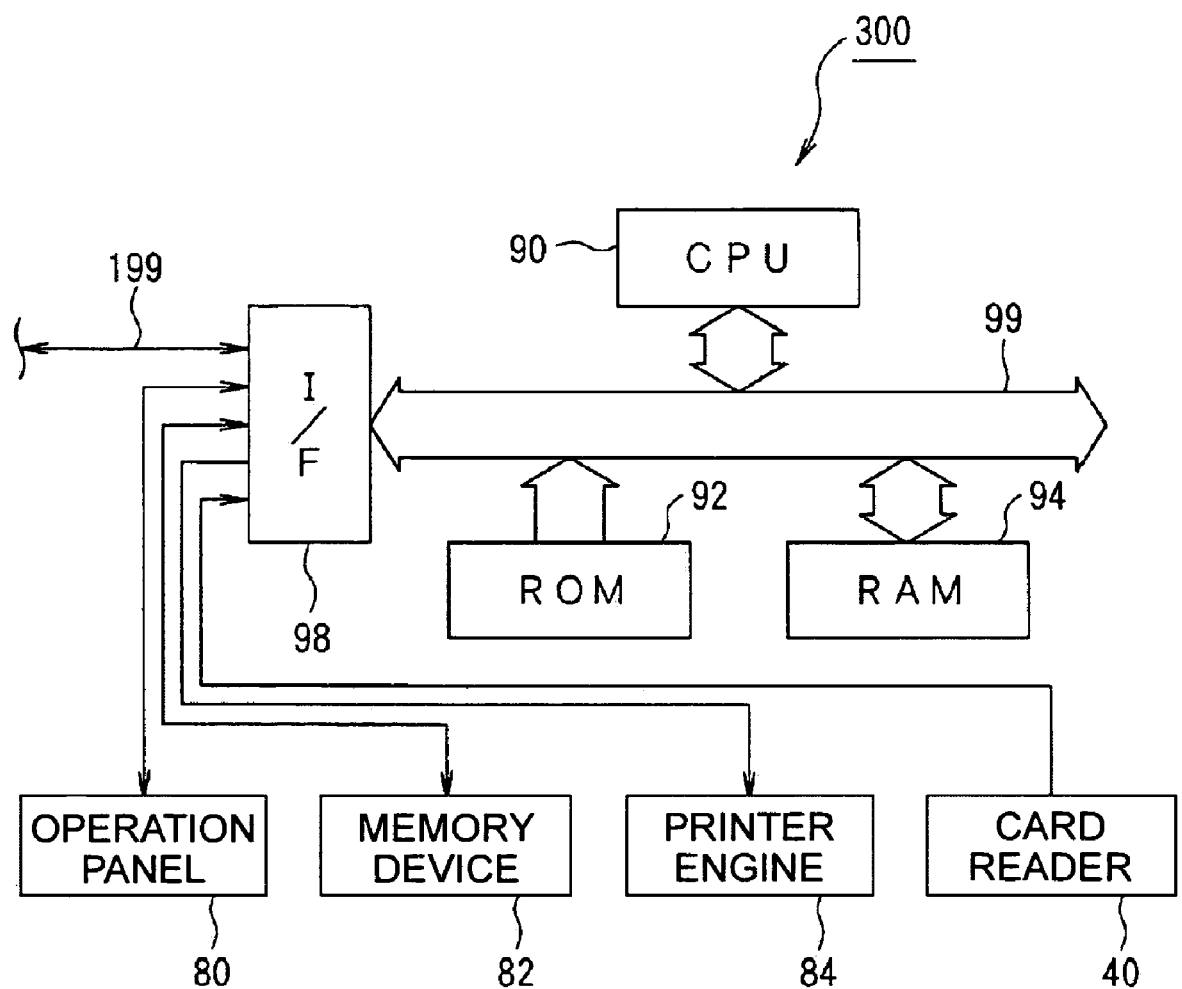
FIG. 12 is a block diagram showing the hardware construction of a network printer 300.

FIG. 12 is a block diagram showing the hardware construction of the network printer 300.

As shown in FIG. 12, the network printer 300 is constructed by a CPU 90 for controlling an arithmetic operation and the operation of the entire system on the basis of a control program, a ROM 92 for storing the control program of the CPU 90, etc. to a predetermined area in advance, a RAM 94 for storing data read out of the ROM 92, etc. and an arithmetic result required in an arithmetic process of the CPU 90, and an I/F 98 for mediating the input and output of data with respect to an external device. These elements are mutually connected by a bus 99 as a signal line for transferring data so as to transmit and receive data.

An operation panel 80 constructed by a touch panel, etc. able to input and display data as a human interface, a memory device 82 for storing data, a table, etc. as a file, a printer engine 84 constructed by a printing head, a head driving portion, and other mechanisms required in printing, a card reader 40, and a signal line for connection to the network 199 are connected to the I/F 98 as the external device.

Similar to the printer server 200, the memory device 82 registers print data and stores the print data managing table 400 for managing the print data.

The CPU 90 is constructed by a micro processing unit, etc., and starts a predetermined program stored to a predetermined area of the ROM 92. In accordance with this program, the CPU 90 executes authentication card reading processing shown in the flow chart of FIG. 13.

The authentication card reading processing will first be explained in detail with reference to FIG. 13.

Figure 13:
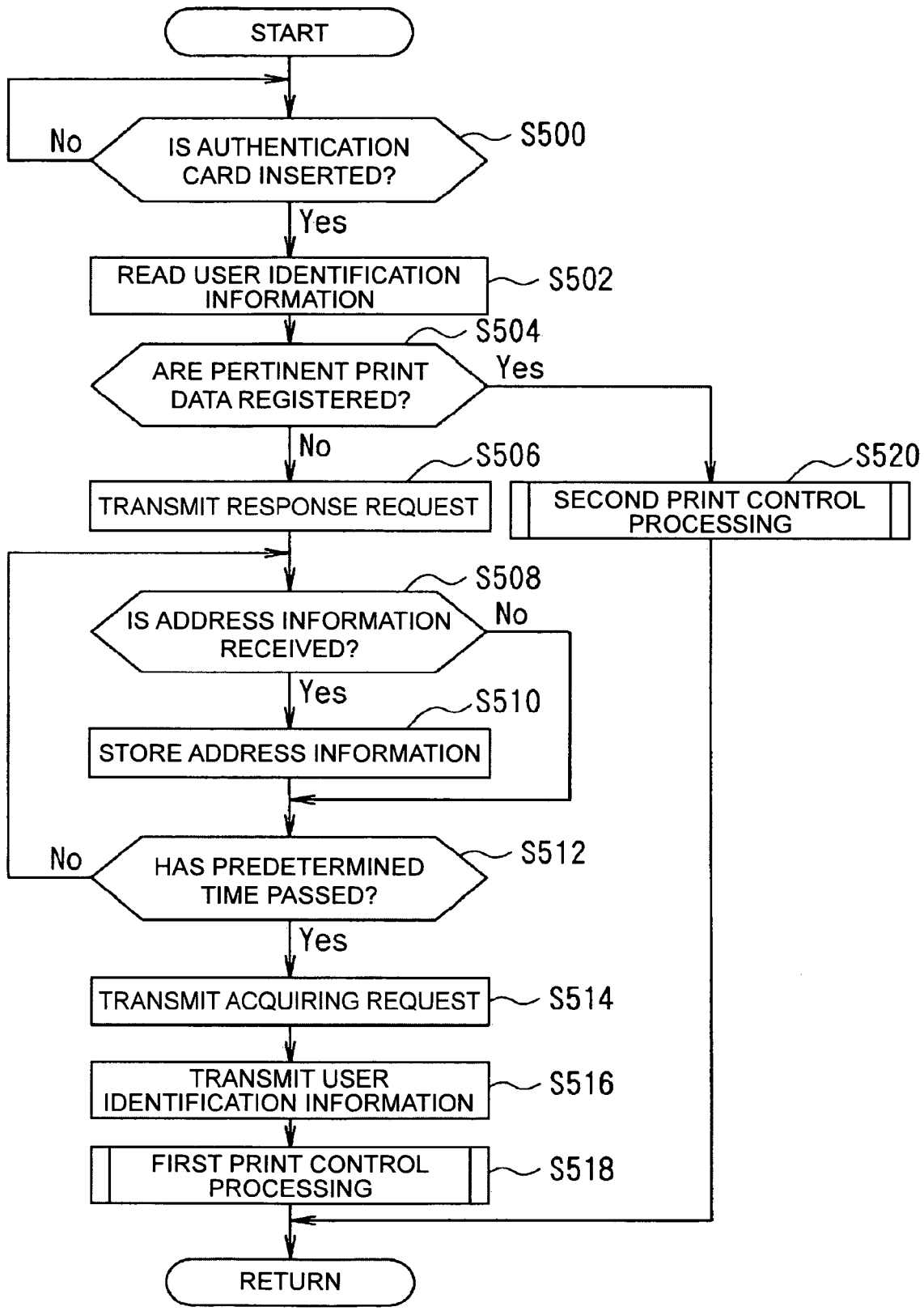
FIG. 13 is a flow chart showing authentication card reading processing.

FIG. 13 is a flow chart showing the authentication card reading processing.

The authentication card reading processing is processing for reading the user identification information from an authentication card by the card reader 40. When the authentication card reading processing is executed in the CPU 90, it first proceeds to step S500 as shown in FIG. 13.

In step S500, it is judged whether the authentication card is inserted into the card reader 40 or not. When it is judged that the authentication card is inserted (Yes), it proceeds to step S502. In contrast to this, when it is judged that no authentication card is inserted (No), it waits in step S500 until the authentication card is inserted.

In step S502, the user identification information is read from the authentication card by the card reader 40, and it proceeds to step S504. In this step, with reference to the print data managing table 400, it is judged whether the print data corresponding to the read user identification information are registered to the memory device 82 or not. When it is judged that no pertinent print data are registered (No), it proceeds to step S506.

In step S506, a response request is transmitted by the broadcast communication, and it proceeds to step S508. In this step, it is judged whether address information is received or not. When it is judged that the address information is received (Yes), it proceeds to step S510. In this step, the received address information is stored to the memory device 82, and it proceeds to step S512.

In step S512, it is judged that a predetermined time (e.g., 10 seconds) has passed from the transmission of the response request or not. When it is judged that the predetermined time has passed (Yes), it proceeds to step S514.

In step S514, an acquiring request of the print data is transmitted to the printer server 200 on the basis of the address information of the memory device 82. It then proceeds to step S516, and the read user identification information is transmitted to the printer server 200 on the basis of the address information of the memory device 82. It then proceeds to step S518 and first print control processing is executed and a series of processings is terminated and it is returned to the original processing.

In contrast to this, when it is judged in step S512 that no predetermined time has passed from the transmission of the response request (No), it proceeds to step S508.

On the other hand, when it is judged in step S508 that no address information is received (No), it proceeds to step S512.

In contrast to this, when it is judged in step S504 that the pertinent print data are registered to the memory device 82 (Yes), it proceeds to step S520 and second print control processing is executed and a series of processings is terminated and it is returned to the original processing.

Next, the first print control processing of step S518 will be explained in detail with reference to FIG. 14.

Figure 14:
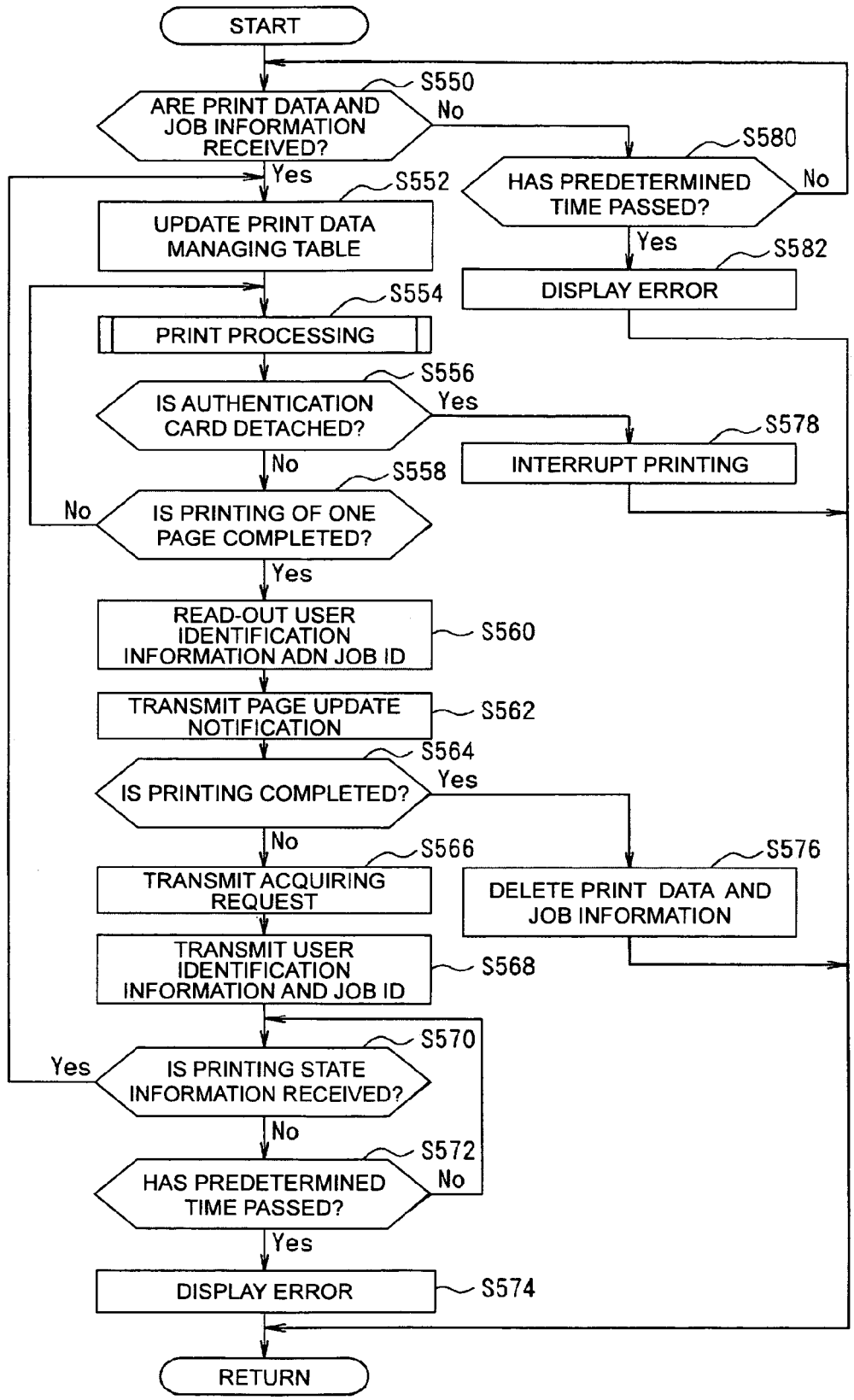
FIG. 14 is a flow chart showing print control processing.

FIG. 14 is a flow chart showing the print control processing.

When the print control processing is executed in step S518, it first proceeds to step S550 as shown in FIG. 14.

In step S550, it is judged whether the print data and the job information are received or not. When it is judged that the print data and the job information are received (Yes), it proceeds to step S552. In this step, the received print data are registered to the memory device 82, and the print data managing table 400 is updated on the basis of the received job information. When the print data managing table 400 is updated on the basis of the job information received in step S550, the received job information is registered to the print data managing table 400. When the print data managing table 400 is updated on the basis of the printing state information received in step S570, the print data managing table 400 is updated by updating the contents of the record corresponding to the print data being printed and processed at present on the basis of the received printing state information.

Next, it proceeds to step S554 and printing is performed by the printer engine 84 from the page next to a print completion page on the basis of the print data of the memory device 82 and the print data managing table 400. It then proceeds to step S556, and it is judged whether the authentication card is detached from the card reader 40 or not. When it is judged that no authentication card is detached (No), it proceeds to step S558.

In step S558, it is judged whether the printing of one page is completed or not. When it is judged that the printing of one page is completed (Yes), it proceeds to step S560. In this step, the user identification information and the job ID corresponding to the print data being printed and processed at present are read out of the print data managing table 400, and it proceeds to step S562. In this step, a page update notification including the read user identification information and job ID is transmitted to the printer server 200 on the basis of the address information of the memory device 82, and it proceeds to step S564.

In step S564, it is judged whether the printing is completed or not. When it is judged that no printing is completed (No), it proceeds to step S566 and an acquiring request of the printing state information is transmitted to the printer server 200 on the basis of the address information of the memory device 82. It then proceeds to step S568, and the read user identification information and job ID are transmitted to the printer server 200 on the basis of the address information of the memory device 82, and it proceeds to step S570.

In step S570, it is judged whether the printing state information is received or not. When it is judged that the printing state information is received (Yes), it proceeds to step S552.

In contrast to this, when it is judged in step S570 that no printing state information is received (No), it proceeds to step S572, and it is judged whether a predetermined time (e.g., one minute) has passed from the transmission of the acquiring request of the printing state information or not. When it is judged that the predetermined time has passed (Yes), it proceeds to step S574, and an error message is displayed in the operation panel 80. A series of processings is then terminated and it is returned to the original processing.

In contrast to this, when it is judged in step S572 that no predetermined time has passed (No), it proceeds to step S570.

In contrast to this, when it is judged in step S564 that the printing is completed (Yes), it proceeds to step S576, and the print data being printed and processed at present are deleted from the memory device 82. Further, the record corresponding to the print data being printed and processed at present is deleted from the print data managing table 400, and a series of processings is terminated and it is returned to the original processing.

On the other hand, when it is judged in step S558 that no printing of one page is completed (No), it proceeds to step S554.

On the other hand, when it is judged in step S556 that the authentication card is detached (Yes), it proceeds to step S578 and the printing is interrupted and a series of processings is terminated and it is returned to the original processing.

On the other hand, when it is judged in step S550 that the print data and the job information are not received (No), it proceeds to step S580 and it is judged whether a predetermined time (e.g., one minute) has passed from the transmission of the acquiring request of the print data or not. When it is judged that the predetermined time has passed (Yes), it proceeds to step S582 and an error message is displayed in the operation panel 80 and a series of processings is terminated and it is returned to the original processing.

On the other hand, when it is judged in step S580 that no predetermined time has passed (No), it proceeds to step S550.

Next, the second print control processing of step S520 will be explained in detail with reference to FIG. 15.

Figure 15:
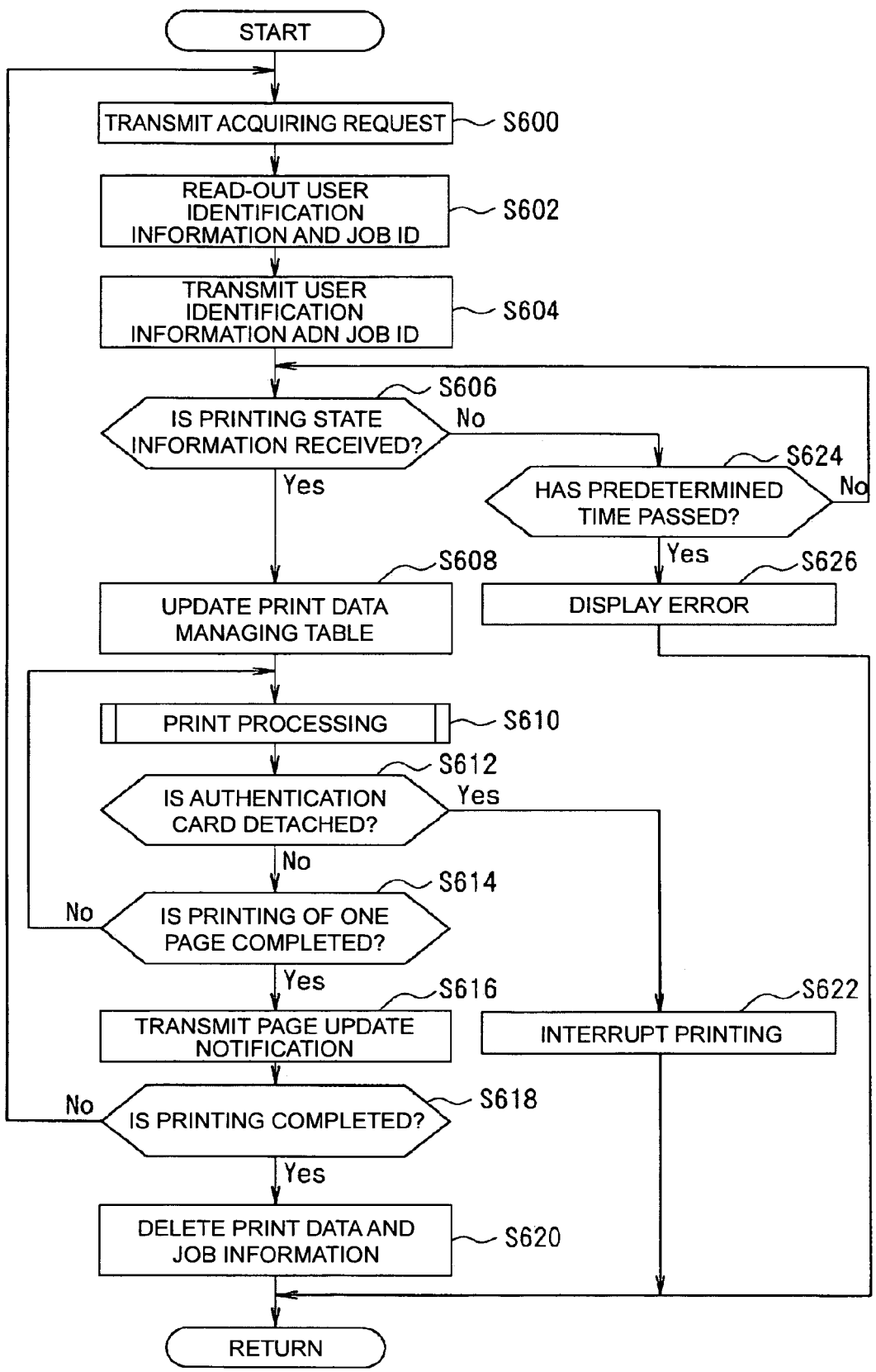
FIG. 15 is a flow chart showing the print control processing.

FIG. 15 is a flow chart showing the print control processing.

When the print control processing is executed in step S520, it first proceeds to step S600 as shown in FIG. 15.

In step S600, the acquiring request of the printing state information is transmitted to the printer server 200 on the basis of the address information of the memory device 82, and it proceeds to step S602. In this step, the user identification information and the job ID corresponding to the print data being printed and processed at present are read out of the print data managing table 400, and it proceeds to step S604. In this step, the read user identification information and job ID are transmitted to the printer server 200 on the basis of the address information of the memory device 82, and it proceeds to step S606.

In step S606, it is judged whether the printing state information is received or not. When it is judged that the printing state information is received (Yes), it proceeds to step S608 and the print data managing table 400 is updated on the basis of the received printing state information. The print data managing table 400 is updated by updating the contents of the record corresponding to the print data being printed and processed at present on the basis of the received printing state information.

Next, it proceeds to step S610 and printing is performed by the printer engine 84 from the page next to a print completion page on the basis of the print data of the memory device 82 and the print data managing table 400. It then proceeds to step S612 and it is judged whether the authentication card is detached from the card reader 40. When it is judged that no authentication card is detached (No), it proceeds to step S614.

In step S614, it is judged whether the printing of one page is completed or not. When it is judged that the printing of one page is completed (Yes), it proceeds to step S616 and a page update notification including the read user identification information and job ID is transmitted to the printer server 200 on the basis of the address information of the memory device 82, and it proceeds to step S618.

In step S618, it is judged whether the printing is completed or not. When it is judged that no printing is completed (No), it proceeds to step S600.

In contrast to this, when it is judged in step S618 that the printing is completed (Yes), it proceeds to step S620 and the print data being printed and processed at present are deleted from the memory device 82. Further, the record corresponding to the print data being printed and processed at present is deleted from the print data managing table 400, and a series of processings is terminated and it is returned to the original processing.

In contrast to this, when it is judged in step S614 that no printing of one page is completed (No), it proceeds to step S610.

On the other hand, when it is judged in step S612 that the authentication card is detached (Yes), it proceeds to step S622 and the printing is interrupted and a series of processings is terminated and it is returned to the original processing.

On the other hand, when it is judged in step S606 that no printing state information is received (No), it proceeds to step S624 and it is judged whether a predetermined time (e.g., one minute) has passed from the transmission of the acquiring request of the printing state information or not. When it is judged that the predetermined time has passed (Yes), it proceeds to step S626 and an error message is displayed in the operation panel 80 and a series of processings is terminated and it is returned to the original processing.

In contrast to this, when it is judged in step S624 that no predetermined time has passed (No), it proceeds to step S606.

The operation of this embodiment mode will next be explained.

First, a case printed by one network printer 300 will be explained.

A user edits document data by utilizing the document making application 10 in the host terminal 100, and requests printing.

When the printing is requested in the host terminal 100, print data are generated by the printer driver on the basis of the document data via steps S102 to S106. The generated print data are transmitted to the printer server 200 together with the print request.

When the print request is received in the printer server 200, the print data are received via steps S202, S204 and an acquiring request of identification information is transmitted to the host terminal 100 of a request source.

When the acquiring request of the identification information is received in the host terminal 100, the user identification information of the user utilizing the host terminal 100 at present and the driver identification information relating to the printer driver utilized to generate the print data are acquired via steps S152 to S156. The acquired user identification information and driver identification information are transmitted to the printer server 200 of the request source.

When the user identification information and the driver identification information are received in the printer server 200, the received print data are analyzed and the total page number is acquired and the job ID is issued via steps S208, S210. The received print data are then registered to the memory device 63 via step S212, and the issued job ID, the name of the received print data, the user identification information and the driver identification information are correspondingly set and are registered to the print data managing table 400. Further, the printing state is initialized on the basis of the acquired total page number.

Next, the user inserts the authentication card into the card writer 66 in the host terminal 100, and writes the self user identification information into the authentication card by the card writer 66. The user identification information may be also written into the authentication card in advance.

Next, the user goes to the place of one network printer 300, and inserts the authentication card recording the user identification information into the card reader 40.

When the authentication card is inserted into the card reader 40 in the network printer 300, the user identification information is read from the authentication card by the card reader 40 via step S502. A response request is then transmitted by the broadcast communication via step S506.

When the response request is received in the printer server 200, it is judged whether the driver identification information corresponding to the network printer 300 of the request source is registered to the print data managing table 400 via step S252 or not. The corresponding driver identification information ought to be registered to one printer server 200. Accordingly, it is possible to judge the registration of the driver identification information in one printer server 200. When the registration of the driver identification information is judged, the address information showing a self network address is transmitted to the network printer 300 of the request source via step S254.

When the address information is received in the network printer 300, the received address information is stored to the memory device 82 via step S510. The read user identification information is then transmitted to the printer server 200 together with the acquiring request of the print data on the basis of the address information of the memory device 82 via steps S514, S516.

When the acquiring request of the print data is received in the printer server 200, the user identification information is received and the print data corresponding to the received user identification information are retrieved via steps S302, S304. The pertinent print data ought to be registered to one printer server 200. Accordingly, the pertinent print data can be retrieved and outputted in one printer server 200. When the pertinent print data are retrieved and outputted, the job information corresponding to the retrieved and outputted print data is read out via steps S308, S310. The retrieved and outputted print data and the read job information are transmitted to the network printer 300 of the request source.

When the print data and the job information are received in the network printer 300, the received print data are registered to the memory device 82 via steps S552, S554, and the print data managing table 400 is updated on the basis of the received job information. Further, a first page is printed on the basis of the print data of the memory device 82 and the print data managing table 400. Every time the printing of a page unit is completed, a page update notification is transmitted to the printer server 200 via step S562.

When the page update notification is received in the printer server 200, the print data managing table 400 is updated via step S402.

In the network printer 300, the user identification information and the job ID are further transmitted to the printer server 200 together with the acquiring request of the printing state information via steps S566, S568.

When the acquiring request of the printing state information is received in the printer server 200, the user identification information and the job ID are received via steps S352, S354, and job information corresponding to the received user identification information and job ID is retrieved. The pertinent job information ought to be registered to one printer server 200. Accordingly, the pertinent job information can be retrieved and outputted in one printer server 200. When the pertinent job information is retrieved and outputted, the printing state information showing the printing state included in the retrieved and outputted job information is transmitted to the network printer 300 of the request source via step S358.

When the printing state information is received in the network printer 300, the print data managing table 400 is updated on the basis of the received printing state information via steps S552, S554, and a second page is printed on the basis of the print data of the memory device 82 and the print data managing table 400.

A changing case of a printing destination will next be explained.

When the user wants to change the printing destination to another network printer 300, the user first detaches the authentication card from the network printer 300 performing the print processing at present.

When the authentication card is detached, the printing is interrupted in the network printer 300 via step S578.

Next, the user goes to the place of another network printer 300, and inserts the authentication card into the card reader 40.

When the authentication card is inserted in the network printer 300, an operation similar to the above operation is performed and the print data and the job information are received. Further, printing is performed from the page next to a print completion page on the basis of the print data of the memory device 82 and the print data managing table 400. When the printing is completed until a second page in the network printer 300 before the change, the printing of a third page is restarted. When the similar operation is repeated and the printing is completed, a page update notification is transmitted to the printer server 200 via steps S562, S564, S576, and the record of the print data being printed and processed at present and the print data managing table 400 corresponding to these print data is deleted.

When the page update notification is received in the printer server 200, it is judged that the printing is completed. Accordingly, the record of the print data being printed and processed at present and the print data managing table 400 corresponding to these print data is deleted via step S406.

Next, a restarting case of the printing in the same network printer 300 after the printing is temporarily interrupted will be explained.

When the user temporarily interrupts the printing, the user detaches the authentication card from the network printer 300 performing the print processing at present.

When the authentication card is detached, the printing is interrupted in the network printer 300 via step S578.

When the user next wants to restart the printing in the same network printer 300, the user goes to the place of this network printer 300 and inserts the authentication card into the card reader 40.

When the authentication card is inserted, the print data interrupted in the printing are left in the memory device 82 in the network printer 300. Accordingly, the user identification information and the job ID are transmitted to the printer server 200 together with the acquiring request of the printing state information via steps S600 to S604.

When the acquiring request of the printing state information is received in the printer server 200, the user identification information and the job ID are received via steps S352, S354, and the job information corresponding to the received user identification information and job ID is retrieved. The pertinent job information ought to be registered to one printer server 200. Accordingly, the pertinent job information can be retrieved and outputted in one printer server 200. When the pertinent job information is retrieved and outputted, the printing state information showing the printing state included in the retrieved and outputted job information is transmitted to the network printer 300 of the request source via step S358.

When the printing state information is received in the network printer 300, the print data managing table 400 is updated on the basis of the received printing state information via steps S608, S610. Further, the printing is performed from the page next to a print completion page on the basis of the print data of the memory device 82 and the print data managing table 400. When the printing is completed until a second page before the interruption, the printing of a third page is restarted. When the similar operation is repeated and the printing is completed, a page update notification is transmitted to the printer server 200 via steps S616 to S620, and the record of the print data being printed and processed at present and the print data managing table 400 corresponding to these print data is deleted.

When the page update notification is received in the printer server 200, it is judged that the printing is completed. Accordingly, the record of the print data being printed and processed at present and the print data managing table 400 corresponding to these print data is deleted via step S406.

When no corresponding driver identification information is registered to the printer server 200, no address information is transmitted even when a response request is received in the printer server 200.

When the authentication card recording the user identification information except for the normal user identification information is used, no pertinent print data can be retrieved and outputted in each printer server 200. Accordingly, no print data can be received within a predetermined time in the network printer 300, and an error message is displayed in the operation panel 80 via step S556.

Thus, in this embodiment mode, when the authentication card is inserted in the network printer 300, the user identification information is read from the authentication card, and the read user identification information is transmitted to the printer server 200. When the print data are received, the printing is performed on the basis of the received print data. The printing is allowed only while the authentication card is inserted into the card reader 40. When the printer server 200 receives the user identification information, the print data corresponding to the received user identification information are retrieved from the memory device 63, and the retrieved and outputted print data are transmitted to the network printer 300.

Thus, the printing is performed if the user gives the authentication card. The printing is interrupted if the user detaches the authentication card. Accordingly, even when a situation in which the user must separate the place of the network printer 300 during the printing is caused, it is possible to reduce a possibility that printing contents are seen by others. Accordingly, security can be improved in comparison with the former case.

Further, in this embodiment mode, the printer server 200 updates the printing state of the print data managing table 400 on the basis of the page update notification from the network printer 300. When the printer server 200 receives the acquiring request of the printing state information, the printer server 200 transmits the printing state information showing the printing state of the print data managing table 400 to the network printer 300. The network printer 300 transmits the page update notification to the printer server 200. When the network printer 300 receives the printing state information, the network printer 300 restarts the printing from the page next to a print completion page on the basis of the received printing state information and print data.

Thus, the printing is interrupted if the user detaches the authentication card. The printing is restarted if the user gives the authentication card to another network printer 300. Accordingly, in the print processing based on one print data, it is possible to improve the degree of freedom for changing the network printer 300 as a printing destination in comparison with the former case.

Further, in this embodiment mode, the network printer 300 transmits a response request by the broadcast communication. When the network printer 300 receives the address information, the network printer 300 transmits the user identification information read from the authentication card to the printer server 200 on the basis of the received address information. When the printer server 200 receives the response request, the printer server 200 transmits self address information to the network printer 300 of a request source.

Thus, it is not necessary to set the address information of the printer server 200 to the network printer 300 in advance. Therefore, the network printer 300 can be easily arranged.

Further, in this embodiment mode, when it is judged that no driver identification information corresponding to the network printer 300 of the request source is registered to the print data managing table 400, the printer server 200 transmits no address information to the network printer 300 of the request source.

Thus, since no address information of the printer server 200 not corresponding to the network printer 300 is transmitted, it is possible to restrain that a traffic amount and a processing load are increased. Further, since no unnecessary address information is transmitted and received on the network 199, it is possible to reduce a possibility that the address information is leaked.

In the above embodiment mode, the host terminal 100 corresponds to the device utilizing apparatus of mode 5 or 25. The print data generating section 11 and step S102 correspond to the output data generating unit of mode 5. Step S102 corresponds to the output data generating step of mode 25. Further, the print data transmitting section 12, the identification information transmitting section 14, the I/F 58 and steps S106, S156 correspond to the second output data transmitting unit of mode 5. Steps S106, S156 correspond to the second output data transmitting step of mode 25. The printer server 200 corresponds to the output data managing device of mode 1, 3, 5, 7, 9 to 12, 14, 16, 21, 23 or 25.

Further, in the above embodiment mode, the print data memory section 20 and the memory device 63 correspond to the output data memory unit of mode 1, 5, 10, 12, 17, 19, 21 or 25. The print data receiving section 21, the identification information receiving section 22, the I/F 78 and steps S202, S206 correspond to the second output data receiving unit of mode 5 or 12. Steps S202, S206 correspond to the second output data receiving step of mode 19 or 25. The print data registering section 23 and step S212 correspond to the output data registering unit of mode 5 or 12. Step S121 corresponds to the output data registering step of mode 19 or 25.

Further, in the above embodiment mode, the user identification information receiving section 25, the I/F 78 and step S302 correspond to the collating information receiving unit of mode 1 or 10. Step S302 corresponds to the collating information receiving step of mode 17 or 21. The print data retrieving section 26 and step S304 correspond to the output data retrieving unit of mode 1 or 10. Further, step S304 corresponds to the output data retrieving step of mode 17 or 21. The print data transmitting section 27, the I/F 78 and step S310 correspond to the output data transmitting unit of mode 1 or 10. Step S310 corresponds to the output data transmitting step of mode 17 or 21.

Further, in the above embodiment mode, the printing state information memory section 28 and the memory device 63 correspond to the output state information memory unit of mode 3, 10, 17 or 23. The page update notification receiving section 29, the I/F 78 and step S400 correspond to the output passage information receiving unit of mode 3 or 10. Step S400 corresponds to the output passage information receiving step of mode 17 or 23. Further, the printing state information updating section 30 and step S402 correspond to the output state information updating unit of mode 3 or 10. Step S402 corresponds to the output state information updating step of mode 17 or 23. The printing state information providing section 31, the I/F 78 and steps S310, S358 correspond to the output state information transmitting unit of mode 3, 4, 10 or 11.

Further, in the above embodiment mode, steps S310, S358 correspond to the output state information transmitting step of mode 17, 18, 23 or 24. The network printer 300 corresponds to the network device of mode 1 to 3, 5, 7 to 10, 17, 21 to 23 or 25. Further, the card reader 40 and step S502 correspond to the collating information reading unit of mode 1, 2, 7 or 8. The card reader 40 corresponds to the collating information reader of mode 14, 15, 21 or 22. Step S502 corresponds to the collating information reading step of mode 14 or 21.

Further, in the above embodiment mode, the user identification information transmitting section 42, the I/F 98 and step S516 correspond to the collating information transmitting unit of mode 1 or 7. Step S516 corresponds to the collating information transmitting step of mode 14 or 21. The print data receiving section 43, the I/F 98 and step S550 correspond to the output data receiving unit of mode 1 or 7. Step S550 corresponds to the output data receiving step of mode 14 or 21. The printing state information acquiring section 44, the I/F 98 and steps S550, S570, S606 correspond to the output state information receiving unit of mode 3 or 9. Steps S550, S570, S606 correspond to the output state information receiving step of mode 16 or 23.

Further, in the above embodiment mode, the printing section 45, the printer engine 84 and steps S554, S610 correspond to the output unit of mode 1 to mode 3, 7 to 9. Steps S554, S610 correspond to the output steps of modes 14 to mode 16, 21 to 23. The printing limit section 46 and steps S556, S578, S612, and S622 correspond to the output limit unit of mode 1, 2, 7 or 8. Steps S556, S578, S612, and S622 correspond to the output limit step of mode 14, 15, 21 or 22. The page update notification transmitting section 47, the I/F 98 and steps S562, S616 correspond to the output passage information transmitting unit of mode 3 or 9.

Further, in the above embodiment mode, steps S562, S616 correspond to the output passage information transmitting step of mode 16 or 23. The authentication card corresponds to the memory medium of mode 1, 2, 7, 8, 14, 15, 21 or 22. The print data correspond to the output data of mode 1, 3, 5, 7, 9, 10, 12, 14, 16, 17, 19, 21, 23 or 25. Further, the user identification information corresponds to the collated information of mode 1, 5, 10, 12, 17, 19, 21 or 25, or corresponds to the collating information of mode 1, 7, 10, 14, 17 or 21. The printing state information corresponds to the output state information of mode 3, 4, 9 to 11, 16 to 18, 23 or 24.

Further, in the above embodiment mode, the page update notification corresponds to the output passage information of mode 3, 4, 9 to 11, 16 to 18, 23 or 24.

In the above embodiment mode, the invention is constructed by arranging the printer server 200, but is not limited to this construction. The invention can be also constructed by arranging the function of the printer server 200 in the host terminal 100 instead of the arrangement of the printer server 200. In this case, the print data memory section 20, the print data registering section 23, the address information providing section 24, the user identification information receiving section 25, the print data retrieving section 26, the print data transmitting section 27, the printing state information memory section 28, the page update notification receiving section 29, the printing state information updating section 30 and the printing state information providing section 31 are arranged in the host terminal 100.

In this case, the host terminal 100 corresponds to the output data managing device of mode 6, 13 or 26. The print data memory section 20 corresponds to the output data memory unit of mode 6, 13, 20 or 26. The print data generating section 11 corresponds to the output data generating unit of mode 6 or 13. The print data registering section 23 corresponds to the output data registering unit of mode 6 or 13.

Further, in the above embodiment mode, the network printer 300 is constructed so as to transmit a response request by the broadcast communication. However, the invention is not limited to this construction, but the network printer 300 can be also constructed so as to transmit the response request by multicast communication and other broadcast communications.

Further, in the above embodiment mode, the print data memory section 20 and the printing state information memory section 28 are constructed so as to be arranged in the printer server 200. However, the invention is not limited to this construction, but the print data memory section 20 or the printing state information memory section 28 can be also constructed so as to be arranged in the host terminal 100 and other terminals except for the network printer 300.

Further, in the above embodiment mode, when each of the processings shown in the flow charts of FIGS. 3, 4, 7 to 11, 13 to 15 is executed, the executing case of the control program stored to each of ROMs 52, 72, 92 in advance has been explained. However, the invention is not limited to this case, but a program showing these procedures may be also read into RAMs 54, 74, 94 from a memory medium storing this program and may be also executed.

Here, the memory medium includes all memory media if these memory media are a semiconductor memory medium of RAM, ROM, etc., a magnetic memory type memory medium of FD, HD, etc., an optical reading system memory medium of CD, CDV, LD, DVD, etc., a magnetic memory type/optical reading system memory medium of MO, etc., and are memory media readable by a computer irrespective of electronic, magnetic, optical reading methods, etc.

Further, in the above embodiment mode, the output system, the network device, the output data managing device, the output program and the output data managing program, and the output method in the invention are applied to the case in which printing is performed by the network printer 300 by utilizing the authentication card as shown in FIG. 1. However, the invention is not limited to this case, but can be also applied to other cases in the scope not departing from the gist of the invention. Instead of the network printer 300, the invention can be applied to e.g., a projector, a home gateway, a personal computer, PDA (Personal Digital Assistant), a network storage, an audio device, a portable telephone, PHS (registered trademark) (Personal Handyphone System), a watch type PDA, STB (Set Top Box), a POS (Point Of Sale) terminal, a FAX device, a telephone (including an IP telephone, etc.), and other output devices.

In the above embodiment mode, the example for performing the authentication processing by reading the authentication information from the authentication card has been explained. However, the invention is not limited to this case, but the authentication processing may be also performed by setting living body information such as a fingerprint, a vein of a finger, a retina, etc. to the authentication information and reading this authentication information from the human body.

Further, in the above embodiment mode, the case that the memory medium storing the authentication information is the authentication card such as an IC card, etc. has been explained. However, the invention is not limited to this case, but the memory medium storing the authentication information may be also a memory medium arranged in a portable type information terminal such as a portable telephone, PDA, etc.

What is claimed is:

1. An output system comprising:
a plurality of network devices including a first network device and a second network device for performing an output based on output data and
an output data managing device for managing the output data, wherein
the plurality of network devices and the output data managing device are communicably connected;
the output data managing device has an output data memory unit for storing the output data correspondingly to collated information; a collating information receiving unit for receiving collating information; an output data retrieving unit for retrieving the output data from the output data memory unit based on the collating information received by the collating information receiving unit; and an output data transmitting unit for transmitting the output data retrieved and outputted by the output data retrieving unit to the network devices;
the network devices each have a collating information reading unit for reading the collating information from a memory medium; a collating information transmitting unit for transmitting the collating information read by the collating information reading unit to the output data managing device; an output data receiving unit for receiving the output data; an output unit for performing the output based on the output data received by the output data receiving unit; and an output limit unit for allowing the output using the output unit only while the memory medium is attached to the collating information reading unit;
the output limit unit of the first network device allowing the output using the output unit of the first network device when the memory medium is attached to the collating information reading unit of the first network device, interrupting the output unit of the first network device when the memory medium is detached from the collating information reading unit of the first network device, and restarting the output unit of the first network device when the memory medium is reattached to the collating information reading unit of the first network device;
the output limit unit of the second network device restarting the output using the output unit of the second network device, when the memory medium is attached to the collating information reading unit of the second network device after detachment from the first network device, the output unit of the second network device starting from an interrupting portion of the output based on when the memory medium was detached from the collating information reading unit of the first network device.

2. The output system according to claim 1, wherein
the output data managing device has an output state information memory unit for storing output state information showing an advancing state of the output; an output passage information receiving unit for receiving output passage information showing output passage of the output unit; an output state information updating unit for updating the output state information of the output state information memory unit based on the output passage information received by the output passage information receiving unit; and an output state information transmitting unit for transmitting the output state information of the output state information memory unit to the network devices;
the network devices each having an output passage information transmitting unit for transmitting the output passage information to the output data managing device; and an output state information receiving unit for receiving the output state information; and
the output unit restarts the output from the interrupting portion based on the output state information received by the output state information receiving unit and the output data.

3. The output system according to claim 2, wherein
the output passage information is information showing that the output of a page unit is completed; and
the output state information transmitting unit transmits the output state information showing the page next to a page on which the output is completed.

4. The output system according to claim 1, wherein
a device utilizing apparatus for utilizing the network device is communicably connected to the network devices;
the device utilizing apparatus has an output data generating unit for generating the output data; and a second output data transmitting unit for transmitting the output data generated by the output data generating unit and the collated information to the output data managing device; and
the output data managing device has a second output data receiving unit for receiving the output data and the collated information; and an output data registering unit for correspondingly registering the output data and the collated information received by the second output data receiving unit to the output data memory unit.

5. The output system according to claim 1, wherein
the output data managing device has an output data generating unit for generating the output data; and an output data registering unit for registering the output data generated by the output data generating unit and the collated information to the output data memory unit.

6. An output data managing device for managing output data and comprising:
an output data memory unit for storing the output data correspondingly to collated information; a collating information receiving unit for receiving collating information; an output data retrieving unit for retrieving the output data from the output data memory unit based on the collating information received by the collating information receiving unit; an output data transmitting unit for transmitting the output data retrieved and outputted by the output data retrieving unit to a first network device when memory medium storing collating information is attached to the first network device; an output state information memory unit for storing output state information showing an advancing state of the output; an output passage information receiving unit for receiving output passage information showing output passage of the first network device; an output state information updating unit for updating the output state information of the output state information memory unit based on the output passage information received by the output passage information receiving unit; and an output state information transmitting unit for transmitting the output state information of the output state information memory unit to the network device; the output data transmitting unit transmitting the output data retrieved and outputted by the output data retrieving unit to a second network device when the memory medium is detached from the first network device, the second network device restarting the output from an interrupting portion of the output based on when the memory medium was detached from first network device.

7. An output data managing program stored in a computer readable medium for managing output data and including:

a program for making a computer execute a collating information receiving step for receiving collating information; an output data retrieving step for retrieving the output data from an output data memory unit for storing the output data correspondingly to collated information based on the collating information received in the collating information receiving step; a first output data transmitting step for transmitting the output data retrieved and outputted in the output data retrieving step to a network device when a memory medium storing collating information is attached to the first network device; an output passage information receiving step for receiving output passage information showing output passage of the first network device; an output state information updating step for updating output state information of an output state information memory unit for storing the output state information showing an advancing state of the output based on the output passage information received in the output passage information receiving step; and an output state information transmitting step for transmitting the output state information of the output state information memory unit to the first network device; a second output data transmitting step for transmitting the output data retrieved and outputted by the output data retrieving step to a second network device when the memory medium is detached from the first network device, the second network device restarting the output from an interrupting portion of the output based on when the memory medium was detached from the first network device.

8. An output method for communicably connecting a plurality of network devices, including a first network device and a second network device, for performing an output based on output data, and an output data managing device for managing the output data, and performing the output by the network devices, wherein:

with respect to the network device, the output method includes a collating information reading step for reading collating information by a collating information reader of the first network device from a memory medium given to the first network device; and a collating information transmitting step for transmitting the collating information read in the collating information reading step to the output data managing device;

with respect to the output data managing device, the output method includes a collating information receiving step for receiving the collating information; an output data retrieving step for retrieving the output data from output data memory unit for storing the output data correspondingly to collated information based on the collating information received in the collating information receiving step; and an output data transmitting step for transmitting the output data retrieved and outputted in the output data retrieving step to the first network device; and with respect to the first network device, the output method includes an output data receiving step for receiving the output data; an output step for performing the output based on the output data received in the output data receiving step; an output limit step for allowing the output in the output step only while the memory medium is attached to the collating information reader of the first network device; an interrupting step for interrupting the output step when the memory medium is detached from the collating information reader of the first network device;

with respect to the second network device, the output method includes a restarting step for restarting the output using the second network device when the memory medium is attached to a collating information reader of the second network device, the output restarting from an interrupting portion of the output based on when the memory medium was detached from the collating information reading unit of the first network device.

* * * * *